United States Patent
Fujita

(10) Patent No.: US 10,707,667 B2
(45) Date of Patent: Jul. 7, 2020

(54) GAS INSULATED BUS

(71) Applicant: Mitsubishi Electric Corporation, Chiyoda-ku, Tokyo (JP)

(72) Inventor: Daisuke Fujita, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 52 days.

(21) Appl. No.: 15/003,034

(22) Filed: Jan. 21, 2016

(65) Prior Publication Data
US 2016/0141854 A1    May 19, 2016

Related U.S. Application Data

(62) Division of application No. 13/996,761, filed as application No. PCT/JP2011/054537 on Feb. 28, 2011, now abandoned.

(51) Int. Cl.
*H02G 5/06* (2006.01)
*H01B 17/36* (2006.01)

(52) U.S. Cl.
CPC ............ *H02G 5/063* (2013.01); *H01B 17/36* (2013.01); *H02G 5/066* (2013.01); *H02G 5/06* (2013.01); *H02G 5/065* (2013.01); *H02G 5/068* (2013.01)

(58) Field of Classification Search
CPC ........ H02G 5/063; H02G 5/065; H02G 5/066; H02G 5/068; H02G 5/06; H02B 13/02; H02B 13/025; H02B 13/055
See application file for complete search history.

(56) References Cited

U.S. PATENT DOCUMENTS

| | | | | |
|---|---|---|---|---|
| 3,324,272 A | * | 6/1967 | Shankle | ............. H01B 17/42 174/140 R |
| 3,546,356 A | * | 12/1970 | Graybill | ............. H01B 9/0672 174/21 C |
| 3,585,271 A | * | 6/1971 | Reynolds | ............. H02G 5/063 174/16.2 |

(Continued)

FOREIGN PATENT DOCUMENTS

| JP | 11-98661 A | 4/1999 |
|---|---|---|
| JP | 4436896 B1 | 1/2010 |

(Continued)

*Primary Examiner* — Steven T Sawyer
*Assistant Examiner* — Paresh H Paghadal
(74) *Attorney, Agent, or Firm* — Buchanan Ingersoll & Rooney PC

(57) ABSTRACT

A gas insulated bus is provided which comprises a metallic container whose axis is an axis line; a main circuit conductor housed in the metallic container; a metallic container to be connected with an end of the metallic container and whose axis is an axis line crossing the axis line; a main circuit conductor housed in the metallic container; an insulating spacer of a single-leg structure that supports and insulates a connection portion of the main circuit conductors; a metal-made shield attached to the insulating spacer and provided with an opening open in a direction of the axis line and an opening open in a direction of the axis line, the shield covering the connection portion, the shield being substantially in a barrel or spindle shape having an outside diameter exceeding that of the main circuit conductors.

13 Claims, 14 Drawing Sheets

PORTION D DETAILS

(56) References Cited

U.S. PATENT DOCUMENTS

| | | | | |
|---|---|---|---|---|
| 3,792,187 A | * | 2/1974 | Depcrymski | H02G 5/063 174/21 C |
| 3,809,801 A | | 5/1974 | Niemoller et al. | |
| 3,842,187 A | * | 10/1974 | Barkan | H01R 35/00 174/13 |
| 3,845,458 A | * | 10/1974 | Himi | H01R 4/00 174/21 JS |
| 4,017,675 A | * | 4/1977 | Hopkins | H02G 5/063 174/21 C |
| 4,029,890 A | * | 6/1977 | Nakata | H02G 5/065 174/14 R |
| 4,059,723 A | * | 11/1977 | Floessel | H02G 5/063 174/16.2 |
| 4,370,511 A | * | 1/1983 | Cookson | H02G 5/066 174/14 R |
| 4,556,755 A | | 12/1985 | Bolin et al. | |
| 4,846,695 A | * | 7/1989 | Iwabuchi | H02G 5/063 439/115 |
| 5,089,665 A | * | 2/1992 | Thuries | H02G 5/068 174/14 R |
| 5,185,497 A | * | 2/1993 | Poth | H02G 5/068 174/19 |
| 5,449,204 A | * | 9/1995 | Greene | F16L 39/005 138/113 |
| 5,496,965 A | * | 3/1996 | Thuries | H02G 5/066 174/14 R |
| 5,558,524 A | * | 9/1996 | Classon | H02B 13/0358 174/21 R |
| 5,571,989 A | * | 11/1996 | Thuries | H02G 5/065 174/24 |
| 5,723,813 A | * | 3/1998 | Ito | H02G 5/068 174/137 B |
| 6,332,785 B1 | * | 12/2001 | Muench, Jr. | H01R 13/53 439/88 |
| 7,612,293 B2 | * | 11/2009 | Arcand | H02G 5/066 174/138 F |
| 8,710,364 B2 | * | 4/2014 | Bernard | H02G 15/08 174/28 |
| 2006/0254791 A1 | * | 11/2006 | Hama | H01H 33/24 174/22 C |
| 2009/0266796 A1 | * | 10/2009 | Kisanuki | H02G 5/068 218/155 |
| 2010/0246085 A1 | * | 9/2010 | Holaus | H02G 5/063 361/111 |
| 2011/0132632 A1 | * | 6/2011 | Komaki | G01R 31/1254 174/24 |
| 2012/0103645 A1 | * | 5/2012 | Shimizu | H02G 5/066 174/24 |

FOREIGN PATENT DOCUMENTS

| | | | | |
|---|---|---|---|---|
| JP | WO 2011007446 A1 | * | 1/2011 | H02G 5/066 |
| WO | WO 2007/116480 A1 | | 10/2007 | |
| WO | WO 2011/007446 A1 | | 1/2011 | |
| WO | WO 2012/066614 A1 | | 5/2012 | |

* cited by examiner

PORTION A

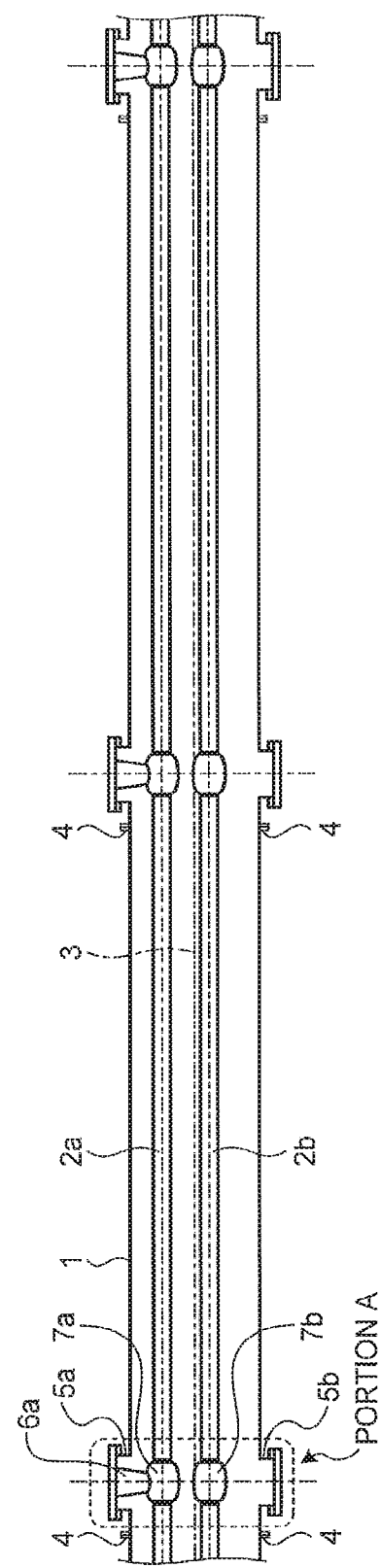

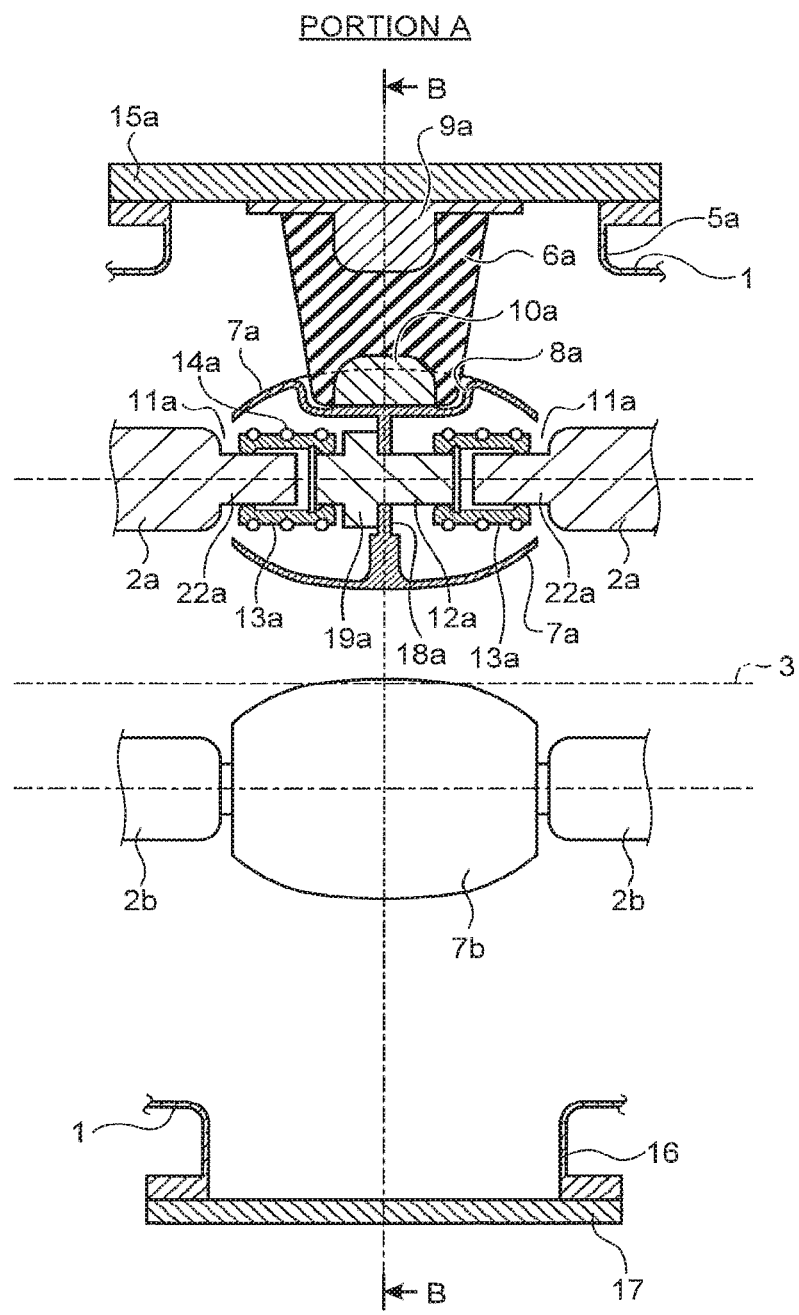

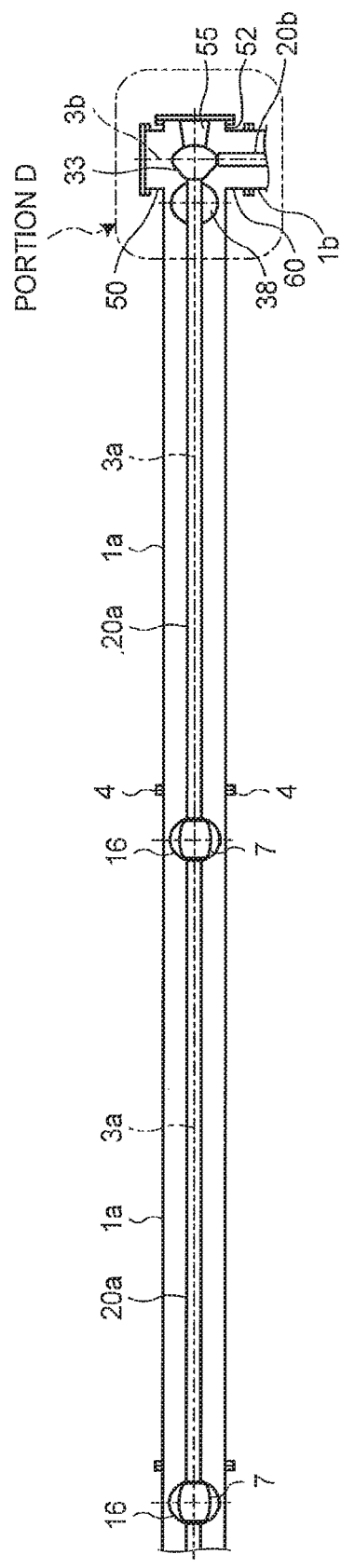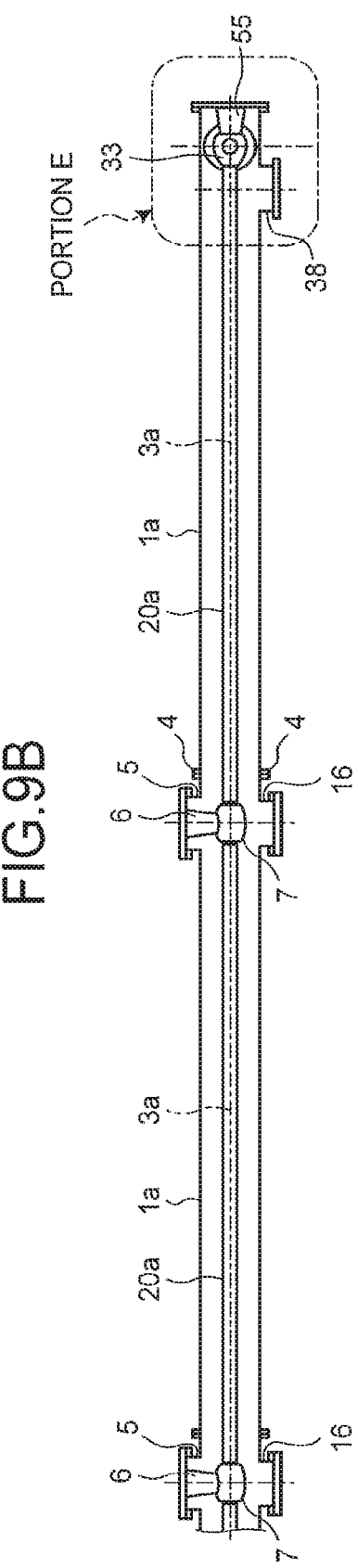

PORTION D DETAILS

F-F

PORTION E DETAILS

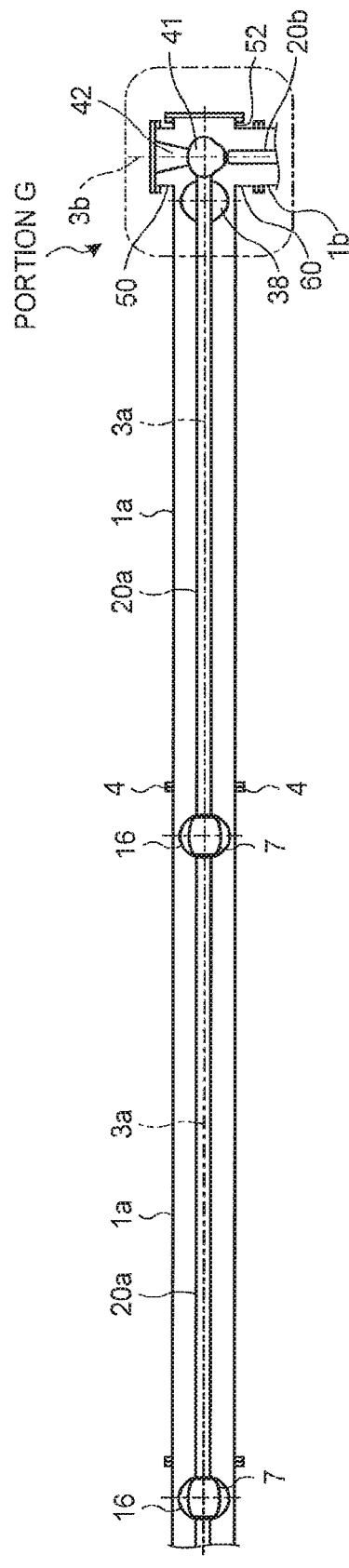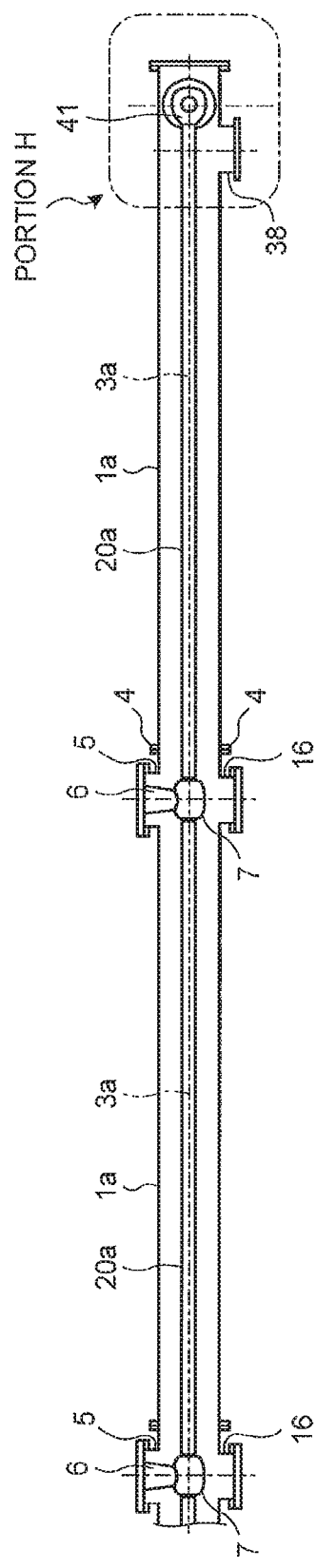

PORTION G DETAILS

K-K

L-L

PORTION H DETAILS

GAS INSULATED BUS

This application is a Division of application Ser. No. 13/996,761 filed on Jun. 21, 2013, which is a National Stage of International Application No. PCT/JP2011/054537 filed on Feb. 28, 2011. The disclosures of the prior applications are hereby incorporated by reference herein in their entirety.

FIELD

The present invention relates to a gas insulated bus wherein a main circuit conductor is placed inside a metallic container filled with an insulating gas and is supported and insulated by insulating spacers.

Gas insulated buses used in electric power plants, electric power substations, or the like are configured with main circuit conductors placed inside a metallic container filled with an insulating gas, which are supported and insulated by insulators from the metallic container.

Patent Literature 1 describes a gas insulated bus which comprises a cylinder-shaped shield that covers ends facing each other of main circuit conductors and a conical insulating support that supports this shield inside a metallic container.

In Patent Literature 2, a main circuit conductor having bends is supported by conical insulating spacers.

CITATION LIST

Patent Literature

Patent Literature 1: Japanese Patent Application Laid-Open Publication No. S61-244214.
Patent Literature 2: Japanese Patent Application Laid-Open Publication No. S59-110307.

SUMMARY

Technical Problem

However, in the gas insulated bus described in the above Patent Literature 1, the electric field tends to be concentrated at ends of the shield.

The gas insulated bus described in the above Patent Literature 2 has a disadvantage in strength as a structure supporting the bends because insulating spacers are provided away from the bends of the main circuit conductor.

The present invention was made in view of the above facts, and an object thereof is to provide a gas insulated bus which, with a simple structure, lessens the electric field concentrated at the ends of the main circuit conductor and of the shield and improves assembly workability with simplifying the structure and also is highly reliable in support strength at the bends of the main circuit conductor.

Solution to Problem

There is provided a gas insulated bus comprising: a first cylinder-shaped metallic container filled with an insulating gas and an axis line of whose main body extends in a first direction; a first main circuit conductor provided extending parallel to the first direction in the first metallic container and the outline of whose cross-section is circular; a second cylinder-shaped metallic container filled with the insulating gas and an axis line of whose main body extends in a second direction crossing the first direction, an end of the second metallic container being connected with an end of the first metallic container; a second main circuit conductor provided extending parallel to the second direction in the second metallic container and connected to the first main circuit conductor inside the end of the first metallic container and the outline of whose cross-section is circular; an insulating spacer of a single-leg structure provided inside the end of the first metallic container and whose one end is fixed to the first metallic container and an other end of which is attached to a connection portion of the first main circuit conductor and the second main circuit conductor, the insulating spacer supporting and insulating the connection portion inside the first metallic container; and a metal-made shield attached to the other end of the insulating spacer and provided with a first opening open in the first direction and a second opening open in the second direction, the shield covering the connection portion, the shield being substantially in a barrel or spindle shape having an outside diameter greater than the outside diameter of the first main circuit conductor and the second main circuit conductor. The end of the first metallic container is provided with a main-circuit branch tube to be connected with the end of the second metallic container. An axis line of the main-circuit branch tube is substantially parallel to the second direction, and a direction of the axis line of the main-circuit branch tube is substantially orthogonal to the first direction.

Advantageous Effects of Invention

According to the present invention, there are produced the effects of, with a simple structure, lessening the electric field concentrated at the ends of the main circuit conductor and of the shield and improving assembly workability with simplifying the structure and also securing the reliability of support strength at the bends of the main circuit conductor.

BRIEF DESCRIPTION OF DRAWINGS

FIG. 6 is a longitudinal cross-sectional view of the gas insulated bus according to Embodiment 2.
FIG. 7 is a detail view of portion A in FIG. 6.
FIGS. 9A and 9B are longitudinal cross-sectional views of the gas insulated bus according to Embodiment 3; (a) is a top view; and (b) is a side view.
FIGS. 15A and 15B are longitudinal cross-sectional views of the gas insulated bus according to Embodiment 4; (a) is a top view; and (b) is a side view.

DESCRIPTION OF EMBODIMENTS

Embodiments of the gas insulated bus according to the present invention will be described in detail below with reference to the drawings. Note that the embodiments are not intended to limit the present invention.

Embodiment 1

Figure 1:
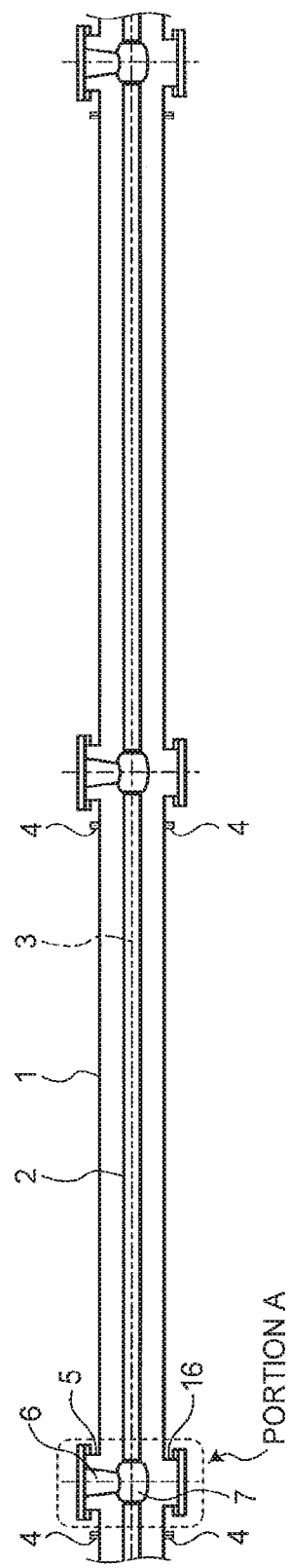
FIG. 1 is a longitudinal cross-sectional view of the gas insulated bus according to Embodiment 1.
Figure 2:
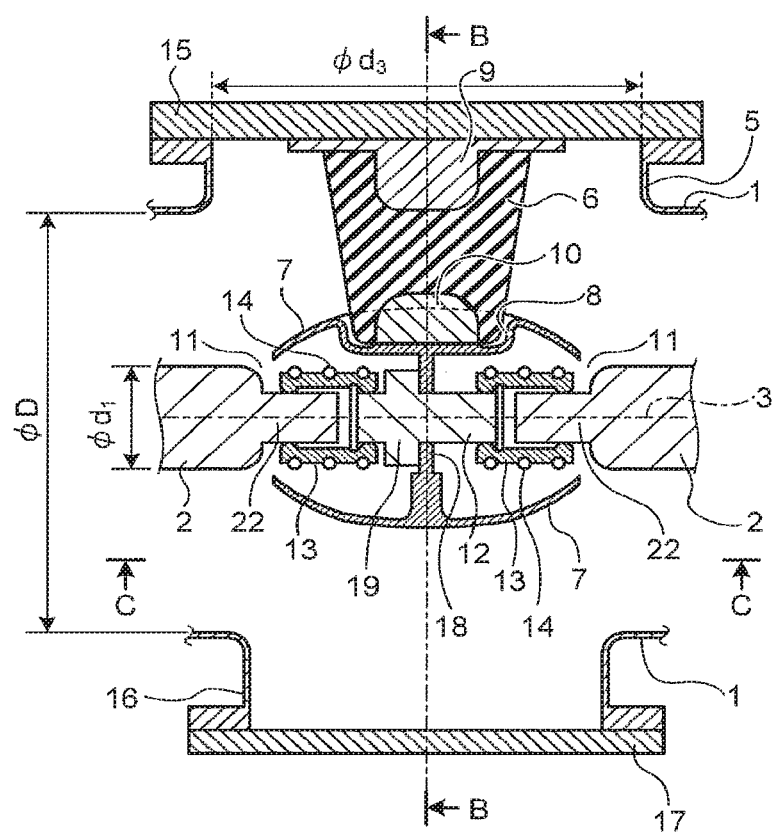
FIG. 2 is a detail view of portion A in FIG. 1.
Figure 3:
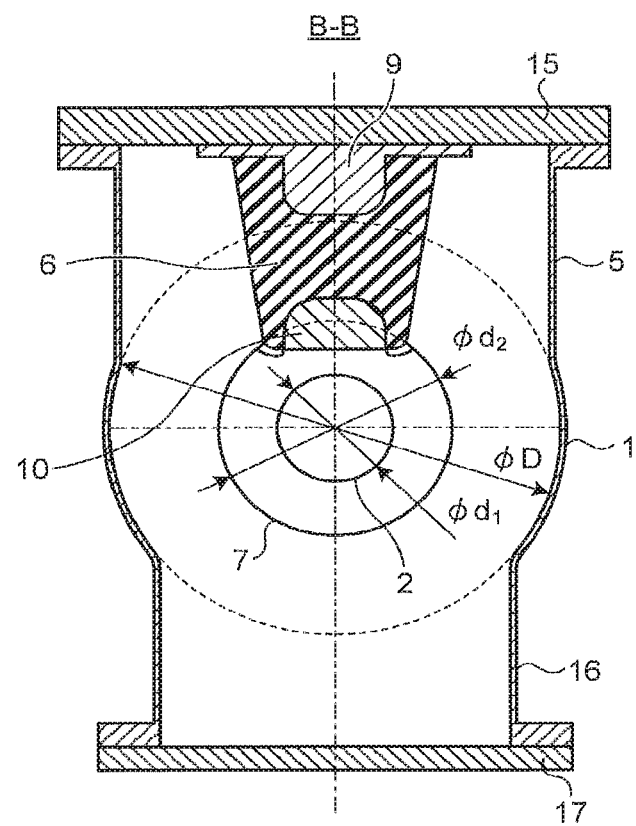
FIG. 3 is a cross-sectional view along line B-B in FIG. 2.
Figure 4:
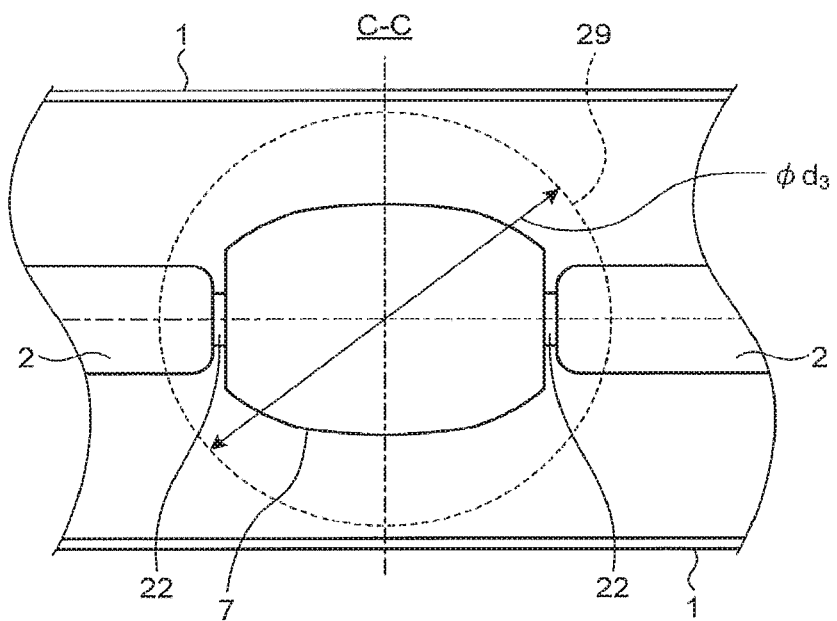
FIG. 4 is a view as viewed in the direction of arrows C in FIG. 2.

FIG. 1 is a longitudinal cross-sectional view of the gas insulated bus according to the present embodiment; FIG. 2 is a detail view of portion A in FIG. 1; FIG. 3 is a cross-sectional view along line B-B in FIG. 2; and FIG. 4 is a view as viewed in the direction of arrows C in FIG. 2.

As shown in FIGS. 1 to 4, in the gas insulated bus according to the present embodiment, a main circuit conductor 2 is housed in a cylinder-shaped metallic container 1 filled with an insulating gas such as sulfur hexafluoride ($SF_6$). The metallic container 1 is placed with its longitudinal direction being, e.g., horizontal. Note that the metallic container 1 may be placed to be vertical or at an angle. An axis line 3 is the center axis of the main body of the metallic container 1. The main circuit conductor 2 is provided extending parallel to the axis line 3, and, for example, the axis line of the main circuit conductor 2 coincides with the axis line 3. The main circuit conductor 2 is a current-carrying portion which allows a current to flow when a voltage is applied. The main circuit conductor 2 is, for example, annular in cross-section, and the outline of that cross-section is circular. The main circuit conductor 2 represents the conductor for one of three phases, and the same structure applies to the other two phases.

The metallic container 1 is constituted by, e.g., cylinder-shaped members with flanges 4 formed at their opposite ends, and is formed of a plurality of the cylinder-shaped members coupled in the direction of the axis line 3 by fastening them to each other with the flanges 4. A structure may be used wherein, e.g., adjacent main bodies of the metallic container 1 are joined by welding instead of the flanges 4. Branch tubes 5 branching off, e.g., upward and branch tubes 16 branching off, e.g., downward are provided on the side surface of the metallic container 1. The branch tubes 5 are placed, e.g., at certain intervals along the direction of the axis line 3, and likewise the branch tubes 16 are placed, e.g., at certain intervals along the direction of the axis line 3. The branch tube 5 is, e.g., a cylindrical branch and branches off, e.g., in the direction substantially orthogonal to the direction of the axis line 3. Likewise, the branch tube 16 is, e.g., a cylindrical branch and branches off, e.g., in the direction substantially orthogonal to the direction of the axis line 3. In the example shown in the figure, the branch tube 16 is provided underneath the branch tube 5 with the axis lines of the branch tube 5 and the axis lines of the branch tube 16 coinciding for example.

The inside diameter of the branch tube 5 can be made, e.g., smaller than or equal to that of the metallic container 1. Because the branch tube 5 is shorter in length than the metallic container 1, forming the branch tube 5 on the metallic container 1 is easier in machining when the inside diameter of the branch tube 5 is equal to or smaller than that of the main body of the metallic container 1 than when the opposite is true. When the inside diameter of the branch tube 5 exceeds that of the main body of the metallic container 1, with the metallic container 1 being divided, a container dedicated to the vicinity of the insulating spacer 6 needs to be made and installed, resulting in an increase in production cost of the metallic container 1. Likewise, the inside diameter of the branch tube 16 can be made smaller than or equal to that of the main body of the metallic container 1.

A lid 15 is attached to the branch tube 5 by, e.g., a bolt or the like. The lid 15 seals against the metallic container 1, and the insulating spacer 6 is attached to the lid 15. The insulating spacer 6 is, e.g., of a single-leg structure. The insulating spacer 6 is shaped, e.g., like a pillar, and its cross-section along a plane perpendicular to the longitudinal direction is, for example, circular. One end of the insulating spacer 6 has an embedded electrode 9 embedded therein, which is an embedded electrode on the metallic container side, and the embedded electrode 9 is fixed to the lid 15 by, e.g., a bolt or the like. That is, one end of the insulating spacer 6 is attached to the lid 15 that is part of the metallic container 1 via the embedded electrode 9. That is, the one end of the insulating spacer 6 is placed in the branch tube 5.

At least part of the embedded electrode 9 is preferably located outside the area, with the axis line 3 as the center, defined by the inside diameter of the main body of the metallic container 1. By this means, the electric field around the embedded electrode 9 is lessened. The electric field is one generated inside the metallic container 1 when current is applied to the main circuit conductor 2. The entire embedded electrode 9 can be located outside the area, with the axis line 3 as the center, defined by the inside diameter of the main body of the metallic container 1, and in this case the electric field around the embedded electrode 9 is most lessened.

The other end of the insulating spacer 6 has an embedded electrode 10 embedded therein, which is an embedded electrode on the shield side. Further, a metal-made shield 7 shaped substantially like a barrel is attached to the other end of the insulating spacer 6 via the embedded electrode 10. Specifically, the shield 7 is fixed to the embedded electrode 10 with use of, e.g., a bolt or the like. The shield 7 is structured to be hollow inside for the current-carrying portion of the main circuit to extend through in the direction of the axis line 3, and has openings 11 respectively in its opposite ends along the direction of the axis line 3 and covers the connection of the main circuit conductors 2. The diameter of the openings 11 of the shield 7 is greater than, e.g., the outside diameter $\phi d_1$ of the main circuit conductor 2. The outside diameter of the shield 7 is greater than the outside diameter $\phi d_1$ of the main circuit conductor 2 regardless of which position along the direction of the axis line 3. Although generally the electric field at the ends of the shield 7 and of the main circuit conductor 2 tends to be large, by shaping the shield 7 substantially like a barrel and making the outside diameter of the shield 7 greater than the outside diameter $\phi d_1$ of the main circuit conductor 2, the equipotential lines are pushed outward to lessen the field concentration near the ends. Also, by shaping the shield 7 substantially like a barrel, the radius of curvature of its center becomes larger to lessen the electric field around the center.

Further, an annular portion 18 shaped, e.g., like an annular plate is provided along its inner circumference substantially at the center of the shield 7 along the direction of the axis line 3. The annular portion 18 has its outer edge connected with the inner surface of the main body of the shield 7 shaped substantially like a barrel, and is placed with its center axis coinciding with, e.g., the axis line 3. An adaptor conductor 12 shaped, e.g., substantially like a cylinder is inserted into the annular portion 18 with its axis line being parallel to the axis line 3 and is fixed to and supported by the annular portion 18 via a guard portion 19 that is part of the adaptor conductor 12. The guard portion 19 is located on one of the surfaces (e.g., the left side surface) of the annular portion 18 along the direction of the axis line 3, and the guard portion 19 and the annular portion 18 are joined by, e.g., a bolt or the like. As described later, the adaptor conductor 12 is used for the connection between ends of the main circuit conductors 2.

Further, a recess 8 is formed in part of the outer surface on the branch tube 5 side of the shield 7. With the other end of the insulating spacer 6 being placed in this recess 8, the insulating spacer 6 is placed being inserted into the shield 7. Thus, at least part of the embedded electrode 10 is placed in the recess 8. By placing at least part of the embedded electrode 10 in the recess 8 that is inward of the outline of the barrel shape, the electric field around the embedded electrode 10 can be lessened. Note that the entire embedded electrode 10 can be placed in the recess 8. In this case, the electric field around the embedded electrode 10 is most lessened.

The main circuit conductor 2 is formed by connecting a plurality of, e.g., tube-shaped conductors having a certain length in the direction of the axis line 3. The connection of the main circuit conductors 2 is located, e.g., where the insulating spacer 6 is installed, and ends 22 of the main circuit conductors 2 to be connected are placed opposite each other inside the shield 7. That is, the end 22 of one of the main circuit conductors is inserted into one of the openings 11 of the shield 7; the end 22 of the other main circuit conductor is inserted into the other opening 11 of the shield 7; these ends 22 are placed a predetermined distance apart and opposite each other; and the adaptor conductor 12 is placed between the ends 22. The end 22 is, e.g., circular in the outline of its cross-section, and its outside diameter is smaller than, e.g., the outside diameter $\phi d_1$ of the main circuit conductor 2.

The end 22 of the one of the main circuit conductors inserted into the one of the openings 11 of the shield 7 is connected with one end of the adaptor conductor 12 via a contact maker 13, and the end 22 of the other main circuit conductor 2 inserted into the other opening 11 of the shield 7 is connected with the other end of the adaptor conductor 12 via another contact maker 13. The contact maker 13 is a contact maker whose contact point with the main circuit conductor 2 is slidable along the direction of the axis line 3 and is a contact maker in, e.g., a tulip shape. In the example shown in the figure, the contact maker 13 is formed of multiple contact pieces arranged circumferentially and bound externally by a garter spring 14, and the end 22 is pushed into the contact maker 13 to be electrically connected with the adaptor conductor 12. Thus, the ends 22 opposite each other are electrically connected via, e.g., the contact makers 13 and the adaptor conductor 12.

Connecting the ends 22 of the main circuit conductors 2 with use of the contact makers 13 makes the operation of connecting the main circuit conductors 2 easy. Further, because the contact maker 13 is a contact maker whose contact point is slidable along the direction of the axis line 3, even if the main circuit conductor 2 thermally expands and contracts in the direction of the axis line 3, the end 22 in contact with the contact maker 13 will move according to the expansion and contraction of the main circuit conductor 2, and thereby the expansion and contraction will be absorbed without excessive stress associated with the expansion and contraction being applied to the connection. Although the contact maker 13 becomes a heat source when current is applied, because the contact maker 13 is placed inside the barrel-shaped shield 7, the inner space and surface area of the shield 7 being broad improves radiation-ability, and thus the thermal effect of temperature increase on the main circuit conductor 2 can be reduced.

As such, the shield 7 holds the main circuit conductors 2 inside the metallic container 1 via the adaptor conductor 12 and the contact makers 13. Also, the shield 7 covers ends 22 of the main circuit conductors 2. Note that the adaptor conductor 12 may be of an integral structure with the shield 7. While the shield 7 is made of, e.g., aluminum, if the adaptor conductor 12 is of an integral structure with the shield 7, the adaptor conductor 12 is also made of, e.g., aluminum. Where high current-carrying performance is required, the adaptor conductor 12 is preferably made of, e.g., copper that is more conductive. In this case, with the adaptor conductor 12 and the shield 7 being made separate parts as shown in the figure, the shield 7 is made of, e.g., aluminum without a change in material, and only the adaptor conductor 12 should be made of, e.g., copper, resulting in a reduction in cost as well. Further, using the adaptor conductor 12 simplifies the connection structure of the contact makers 13.

The outside diameter of the end 22 is set to be smaller than the outside diameter $\phi d_1$ of the main circuit conductor 2. This is because by making the space between the opening 11 of the shield 7 and the main circuit conductor 2 wider, heat generated in the contact makers 13 when current is applied is more likely to escape outside the shield 7, thus further improving radiation-ability. The diameter of the opening 11 of the shield 7 is set to be greater than, e.g., the outside diameter $\phi d_1$ of the main circuit conductor 2, which also produces similar effect.

In the present embodiment, the insulating spacer 6 and the shield 7 are placed within the area 29 defined by the inside diameter of the branch tube 5 in a plan view viewed in a direction parallel to the branching-off direction (axis line direction) of the branch tube 5. That is, letting $\phi d_3$ be the inside diameter of the branch tube 5, the entirety of the insulating spacer 6 and the shield 7 is preferably located within the area 29 in, e.g., a circular shape defined by the inside diameter $\phi d_3$ in the above plan view. By this means, after the insulating spacer 6 and the shield 7 are fit together outside the metallic container 1, the insulating spacer 6 and the shield 7 can be carried through the branch tube 5 and installed inside the metallic container 1, resulting in the assembly being easier. Where the inside diameter of the branch tube 5 is not uniform along the axis line direction of the branch tube 5, a configuration should be made such that the entirety of the insulating spacer 6 and the shield 7 is located within the area defined by its minimum inside diameter.

It is preferable that the inside diameter $\phi D$, of the main body of the metallic container 1, multiplied by $1/e$, where e is the base of natural logarithm, is set to be greater than the outside diameter $\phi d_1$ of the main circuit conductor 2 and smaller than the maximum outside diameter $\phi d_2$ of the shield 7, that is, $$\phi d_1 < \phi D/e < \phi d_2. \tag{1}$$

The reason for this is as follows. First, where the main circuit conductor 2 and the metallic container 1 are coaxial cylinders, the magnitude E of the electric field in the space between them is given by:

$$E = V/(x/2 \cdot \ln(\phi D/2x)). \tag{2}$$

Here, V is the potential of the main circuit conductor 2, and x is the distance from the axis line 3 to any point in a radial direction. It is seen from this that the magnitude E of the electric field takes on a minimum value at 2x=φD/e. Accordingly, by setting the outside diameter φd₁ of the main circuit conductor 2 and the maximum outside diameter φd₂ of the shield 7 such that the diameter φD/e, at which the electric field magnitude is minimal, is sandwiched between them, the electric fields from the two can be made smaller in a balanced manner to reduce the maximum field value for the entire bus.

A lid 17 is attached to the branch tube 16 by, e.g., a bolt or the like. The lid 17 seals against the metallic container 1. When the gas insulated bus is being assembled, with the lid 17 being detached, the operation of connecting the main circuit conductors 2 can be inspected visually through the branch tube 16 from outside the metallic container 1. The length along the direction of the axis line 3 of the shield 7 is preferably shorter than the inside diameter of the branch tube 16. This is because this means improves visibility at the time of connecting the main circuit conductors 2 and further improves the reliability of the assembly operation.

As such, according to the present embodiment, by setting the outside diameter of the shield 7 to be greater than the outside diameter of the main circuit conductor 2, the electric field concentrated at the ends of the shield 7 and the main circuit conductor 2 can be lessened. Further, according to the present embodiment, by shaping the shield 7 substantially like a barrel, the electric field concentrated at the ends of the shield 7 and the main circuit conductor 2 can be lessened. Yet further, according to the present embodiment, because the shield 7 is in a barrel shape, the radius of curvature of its center becomes larger to lessen the electric field around the center. Therefore, according to the present embodiment, the entire electric field inside the metallic container 1 can be lessened, and thus the gas insulated bus can be made smaller.

According to the present embodiment, because the insulating spacer 6 and the shield 7 are placed within the area 29 defined by the inside diameter of the branch tube 5 in a plan view viewed in a direction parallel to the branching-off direction (axis line direction) of the branch tube 5, after the insulating spacer 6 and the shield 7 are fit together outside the metallic container 1, the insulating spacer 6 and the shield 7 can be carried through the branch tube 5 and installed inside the metallic container 1, so that the ease of assembly is improved. Further, because the insulating spacer 6 and the shield 7 are fit together outside the metallic container 1, cleaning and inspection after the assembly are easy to perform as compared with the case where they are fit together inside the metallic container 1, and the possibility is reduced that metallic foreign bodies enter the metallic container 1 to adversely affect the insulation performance of the gas insulated bus.

According to the present embodiment, because the insulating spacer 6 of a single leg is used, the insulating spacer 6 is simplified in structure as compared with spacers of a multi-leg structure such as a two-leg or three-leg structure or a conical spacer, thus improving assembly workability. Further, by using the insulating spacer 6 of a single leg, the surface area of the insulating spacer 6 is reduced as compared with spacers of multiple legs, and metallic foreign bodies are less likely to stick to the insulating spacer 6. Yet further, where the insulating spacer 6 of a single leg is provided above the main circuit conductor 2, even if metallic foreign bodies act at the bottom of the metallic container 1 during operation, they are further less likely to stick to the insulating spacer 6. In addition, by providing the branch tube 16 underneath the insulating spacer 6, even if metallic foreign bodies act at the bottom of the metallic container 1 during operation to come near to the insulating spacer 6, they will fall into the branch tube 16 to be captured without re-floating up from the inside of the branch tube 16 having a low electric field, and are further less likely to stick to the insulating spacer 6, thus contributing to great reliability improvement of insulation performance.

According to the present embodiment, the inside diameter of the branch tube 5 is set to be smaller than or equal to the inside diameter of the main body of the metallic container 1, and hence the production cost of the metallic container 1 can be reduced.

According to the present embodiment, at least part of the embedded electrode 10 on the shield 7 side is placed in the recess 8, and hence the electric field likely to be concentrated around the embedded electrode 10 can be lessened. As such, the recess 8 is provided in the swelling-out portion at the center of the barrel-shaped shield 7, and at least part of the embedded electrode 10 is placed in the recess 8, so that the electric field around the embedded electrode 10 can be lessened, thus reducing the diameter of the metallic container 1. Note that a configuration where the recess 8 is not formed in the shield 7 is also possible.

According to the present embodiment, at least part of the embedded electrode 9 on the metallic container 1 side is located outside the area, with the axis line 3 as the center, defined by the inside diameter of the main body of the metallic container 1, and hence the electric field around the embedded electrode 9 is lessened. As such, with use of the inner space of the branch tube 5, at least part of the embedded electrode 9 is placed outside the area defined by the inside diameter of the main body of the metallic container 1, so that the electric field can be lessened, and hence the inside diameter of the main body of the metallic container 1 does not need to be increased.

According to the present embodiment, it is configured such that the ends 22 are electrically connected with each other via the contact makers 13 inside the shield 7, and hence the operation of connecting the main circuit conductors 2 becomes easy. For example, the method that fixes the ends 22 to the adaptor conductor 12 by a bolt requires an operation of fastening bolts in the metallic container 1 having much of a spatial restraint in terms of the assembly operation, but in the present embodiment, connection is easily made only by inserting the ends 22 into the contact makers 13. Further, with the contact makers 13 being one whose contact point is slidable along the direction of the axis line 3, thermal expansion and contraction in the direction of the axis line 3 of the main circuit conductor 2 can be absorbed in terms of size.

According to the present embodiment, the ends 22 are connected via the adaptor conductor 12, thus simplifying the connection structure of the contact makers 13. Further, the adaptor conductor 12 and the shield 7 being made separate parts is suitable also for the case where the adaptor conductor 12 and the shield 7 need to be made of different materials.

Figure 5A:
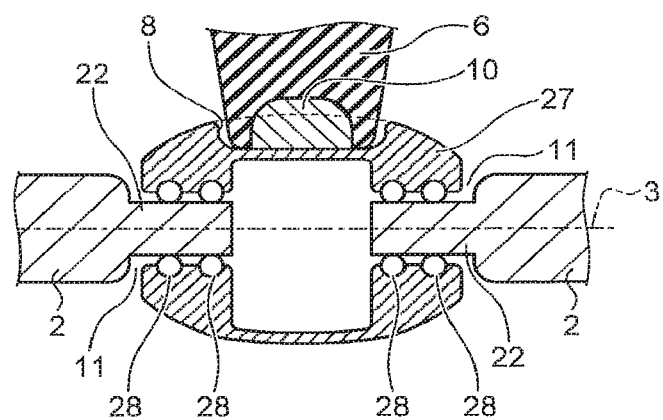
FIGS. 5A and 5B are diagrams showing another connection configuration of ends of main circuit conductors in Embodiment 1.
Figure 5B:
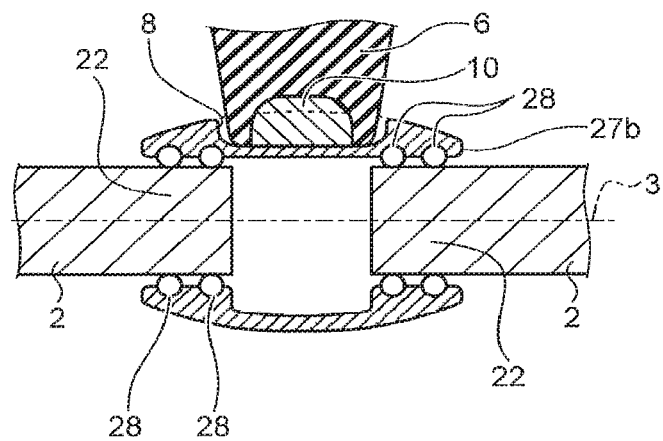

The configuration without using the adaptor conductor 12 to connect the ends 22 is possible. FIG. 5A is a diagram showing another connection configuration of the ends 22. As shown in FIG. 5A, a shield 27 is attached to the insulating spacer 6 via the embedded electrode 10. The shield 27 is the same as the shield 7 in that its outline is shaped substantially like a barrel and that a recess 8 is formed in part of its outer surface, but differs from the shield 7 in inner shape. That is, the openings 11 made in opposite ends of the shield 27 are cylindrical, and its inside diameter is slightly smaller than the outside diameter of the end 22 of the main circuit conductor 2. Annular grooves are formed in the inner circumferential surfaces of opposite ends of the shield 27, and a coil spring contact 28, e.g., annular is placed in each groove. In the example shown in the figure, two coil spring contacts 28 are provided in each end of the shield 27, but one or three or more contacts may be provided. Not being limited to the coil spring contact 28, another band-shaped contact to cover substantially the entire circumference of the end 22 so as to produce the same effect may be used. As shown in FIG. 5B, the outside diameter of the end 22 may be set to be the same as that of the main circuit conductor 2, and the inside diameter of the coil spring contact 28 may be made larger. In this case, the shape of the end 22 of the main circuit conductor 2 can be simplified, and the thermal effect due to temperature increase on the coil spring contact 28 can be reduced. The coil spring contact 28 is placed in a groove in the shield 27*b*. The end 22 is inserted into an annular coil spring contact 28 to be in contact with it and be electrically connected to the shield 27. As such, the ends 22 are put in contact with the coil spring contacts 28 respectively, and thereby are electrically connected via the shield 27. The contact point of the coil spring contact 28 and the end 22 is slidable along the direction of the axis line 3 as with the contact maker 13 of FIG. 2.

According to the present embodiment, one shield 7 and one adaptor conductor 12 need to be used to connect the ends 22, and thus the number of parts is reduced as compared with a conventional configuration where, e.g., two shields and two adaptor conductors are placed respectively on opposite sides of a conical spacer, and also the size of the connection along the direction of the axis line 3 becomes shorter so as to more easily produce the aforementioned effect that, with the shield 7 being placed within the area 29 defined by the inside diameter of the branch tube 5, assembly can be performed outside the metallic container 1.

In the present embodiment, the diameter of the end 22 of the main circuit conductor 2 to be connected with the contact maker 13 is set to be smaller than the diameter $\phi d_1$ of the other parts of the main circuit conductor 2 than the end 22. With this configuration, the space between the end of the shield 7 and the main circuit conductor 2 becomes larger, and thus heat generated in the contact makers 13 when current is applied can be effectively radiated outside the shield 7. Therefore, the current-carrying performance of the main circuit conductor 2 can be prevented from decreasing.

In the present embodiment, the diameter of the opening 11 of the shield 7 is set to be greater than the outside diameter of the main circuit conductor 2. By this means, the space between the end of the shield 7 and the main circuit conductor 2 becomes larger, thus producing the same effect as above, and even if part of the main circuit conductor 2 other than the end 22 comes near to the opening 11 at the time of assembly or thermal expansion due to the application of current, the main circuit conductor 2 and the shield 7 will not come into contact to be damaged, and thus this means contributes to improvement in reliability.

According to the present embodiment, it is configured such that the above equation (1) is satisfied, and hence a balance between the electric field at the surface of the main circuit conductor 2 and the electric field at the surface of the shield 7 (insulation coordination) can be achieved, and the diameter of the metallic container 1 can be optimized to be shrunk.

According to the present embodiment, the insulating spacer 6 is configured so as to be hung from, e.g., the top of the inside of the metallic container 1 so as to support the shield 7, and hence metallic foreign bodies acting in the metallic container 1 under operation voltage are less likely to stick to the insulating spacer 6, resulting in an improvement in the reliability of insulation performance. In this case, the branch tube 5 is also placed at the top of the metallic container 1, and thus heat emitted from the main circuit conductor 2 and the contact maker 13 escapes into the inner space of the branch tube 5, so that radiation-ability is improved.

According to the present embodiment, the branch tube 16 is provided, e.g., on the bottom of the metallic container 1, and hence metallic foreign bodies acting in the metallic container 1 under operation voltage are allowed to fall into the branch tube 16 to be captured. Because, with the outside diameter of the shield 7 being greater than that of the main circuit conductor 2, the electric field becomes higher in the vicinity of the shield 7, metallic foreign bodies act furiously and are more likely to approach the shield 7, and hence it is effective in capturing metallic foreign bodies to provide the branch tube 16 underneath the shield 7. Further, with the lid 17 being detached, the branch tube 16 can act as a manhole for visual inspection at the time of connecting the main circuit conductor 2 with the contact maker 13, thus improving assembly workability and reliability.

Although in this embodiment the axis line of the main circuit conductor 2 and the axis line 3 coincide, they can be placed to be offset from each other. For example, the main circuit conductor 2 can be placed to be offset downward from the axis line 3. In this case, compared with this embodiment, metallic foreign bodies acting in the metallic container 1 under operation voltage are more likely to stick to the main circuit conductor 2 and the insulating spacer 6. That is, in this embodiment the reliability of insulation performance is further improved.

The length along the direction of the axis line 3 of the shield 7 is preferably shorter than the inside diameter of the branch tube 16. This configuration improves visibility when viewing the connecting operation through the branch tube 16 while performing it at the time of connecting the main circuit conductors 2. The other actions and effects of the present embodiment are as described together with the configuration.

Embodiment 2

FIG. 6 is a longitudinal cross-sectional view of the gas insulated bus according to this embodiment; FIG. 7 is a detail view of portion A in FIG. 6; and FIG. 8 is a cross-sectional view along line B-B in FIG. 7.

Figure 8:
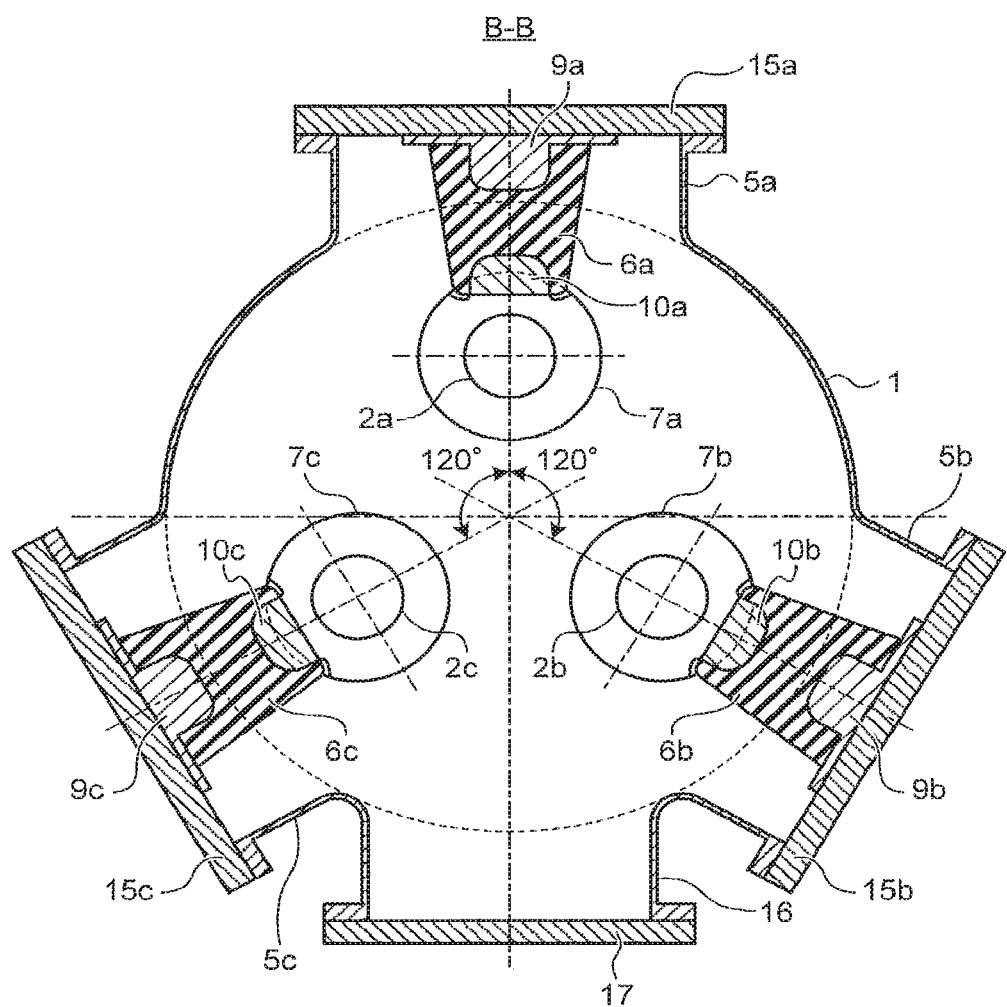
FIG. 8 is a cross-sectional view along line B-B in FIG. 7.

As shown in FIGS. 6 to 8, in the gas insulated bus according to the present embodiment, three phases of main circuit conductors 2*a* to 2*c* are housed as one entity in a cylinder-shaped metallic container 1 filled with an insulating gas such as sulfur hexafluoride ($SF_6$). The metallic container 1 is placed with the axis line 3 that is the center axis of its main body being, e.g., horizontal. Note that the metallic container 1 may be placed to be vertical or at an angle. The main circuit conductors 2*a* to 2*c* are provided extending parallel to the axis line 3. The main circuit conductors 2*a* to 2*c* are, for example, annular in cross-section, and the outline of that cross-section is circular.

The main circuit conductors 2*a* to 2*c* are placed at, e.g., the vertexes of an equilateral triangle in a cross-section orthogonal to the axis line 3 (FIG. 8). That is, the distances from the axis line 3 to the respective center axes of the main circuit conductors 2*a* to 2*c* are equivalent, and, in direction, form an angle of 120° with each other. The main circuit conductors 2b and 2c are placed, e.g., at the same height, and the main circuit conductor 2a is placed above the main circuit conductors 2b, 2c. That is, the equilateral triangle defined by the arrangement of the main circuit conductors 2a to 2c is placed with its one side being horizontal and one vertex being above that side. The arrangement of the main circuit conductors 2a to 2c does not necessarily need to be the vertex position arrangement of an equilateral triangle, but may be, for example, the vertex position arrangement of an isosceles triangle or another triangle. However, an equilateral triangle is the most preferable in terms of insulation performance.

Branch tubes 5a to 5c, 16 are provided, e.g., at certain intervals along the direction of the axis line 3 on the side surface of the metallic container 1. The branch tubes 5a branch off, e.g., upward; the branch tubes 5b branch off, e.g., in an oblique downward direction which forms an angle of 120° to the branching-off direction of the branch tube 5a; and the branch tubes 5c branch off, e.g., in another oblique downward direction which forms an angle of 120° to both the branching-off directions of the branch tubes 5a and 5b. The branch tubes 16 branch off, e.g., downward. The branch tubes 5a to 5c, 16 are, e.g., a cylindrical branch and branch off, e.g., in the direction substantially orthogonal to the direction of the axis line 3. The inside diameters of the branch tubes 5a to 5c are equal, for example.

Next, an insulating support structure for the main circuit conductor 2a will be described. A lid 15a is attached to the branch tube 5a by, e.g., a bolt or the like, and an insulating spacer 6a is attached to the lid 15a. The insulating spacer 6a is, e.g., of a single-leg structure. One end of the insulating spacer 6a has an embedded electrode 9a embedded therein, which is an embedded electrode on the metallic container side, and the embedded electrode 9a is fixed to the lid 15a by, e.g., a bolt or the like. That is, one end of the insulating spacer 6a is attached to the lid 15a that is part of the metallic container 1 via the embedded electrode 9a and is placed in the branch tube 5a.

The inside diameter of the branch tube 5a can be set to be smaller than or equal to, e.g., the inside diameter of the main body of the metallic container 1. Likewise, the inside diameter of the branch tube 16 can be set to be smaller than or equal to the inside diameter of the main body of the metallic container 1.

At least part of the embedded electrode 9a is preferably located outside the area, with the axis line 3 as the center, defined by the inside diameter of the main body of the metallic container 1.

The other end of the insulating spacer 6a has an embedded electrode 10a embedded therein, which is an embedded electrode on the shield side. Further, a metal-made shield 7a shaped substantially like a barrel is attached to the other end of the insulating spacer 6a via the embedded electrode 10a. Specifically, the shield 7a is fixed to the embedded electrode 10a with use of, e.g., a bolt or the like. The shield 7a is structured to be hollow inside for the current-carrying portion of the main circuit to extend through in the direction of the axis line 3, and has openings 11a respectively in its opposite ends along the direction of the axis line 3. The diameter of the opening 11a of the shield 7a is greater than, e.g., the outside diameter of the main circuit conductor 2a. The outside diameter of the shield 7a is greater than the outside diameter of the main circuit conductor 2a regardless of which position along the direction of the axis line 3.

Further, an annular portion 18a shaped, e.g., like an annular plate is provided along its inner circumference substantially at the center of the shield 7a along the direction of the axis line 3. An adaptor conductor 12a shaped, e.g., substantially like a cylinder is inserted into the annular portion 18a and is fixed to and supported by the annular portion 18a via a guard portion 19a that is part of the adaptor conductor 12a.

Further, a recess 8a is formed in part of the outer surface on the branch tube 5a side of the shield 7a. With the other end of the insulating spacer 6a being placed in this recess 8a, the insulating spacer 6a is placed being inserted into the shield 7a. In this case, at least part of the embedded electrode 10a is placed in the recess 8a.

Ends 22a of the main circuit conductors 2a to be connected are placed opposite each other inside the shield 7a. That is, the end 22a of one of the main circuit conductors is inserted into one of the openings 11a of the shield 7a; the end 22a of the other main circuit conductor is inserted into the other opening 11a of the shield 7a; these ends 22a are placed a predetermined distance apart opposite each other; and the adaptor conductor 12a is placed between the ends 22a. The end 22a is, e.g., circular in the outline of its cross-section, and its outside diameter is smaller than, e.g., the outside diameter of the other part of the main circuit conductor 2a.

The end 22a of the one of the main circuit conductors inserted into the one of the openings 11a of the shield 7a is connected with one end of the adaptor conductor 12a via a contact maker 13a, and the end 22a of the other main circuit conductor inserted into the other opening 11a of the shield 7a is connected with the other end of the adaptor conductor 12a via another contact maker 13a. The contact maker 13a is a contact maker whose contact point with the main circuit conductor 2a is slidable along the direction of the axis line 3 and is a contact maker in, e.g., a tulip shape. In the example shown in the figure, the contact maker 13a is formed of multiple contact pieces arranged circumferentially with the axis line of the main circuit conductor 2a as the center and bound externally by a garter spring 14a, and the end 22a is pushed into the contact maker 13a to be electrically connected with the adaptor conductor 12a. Thus, the ends 22a opposite each other are electrically connected via, e.g., the contact makers 13a and the adaptor conductor 12a. As described in Embodiment 1, the configuration to connect the ends 22 without using the adaptor conductor 12a is possible.

As such, the shield 7a holds the main circuit conductors 2a inside the metallic container 1 via the adaptor conductor 12a and the contact makers 13a. Also, the shield 7a covers ends 22a of the main circuit conductors 2a.

As described above, the insulating support structure with the insulating spacer 6a, the shield 7a, the adaptor conductor 12a, and the contact makers 13a for the main circuit conductor 2a is the same as the insulating support structure for the main circuit conductor 2 described in Embodiment 1. The same structure applies to the main circuit conductors 2b, 2c. Although detailed description is omitted, in FIGS. 6 to 8, an insulating spacer 6b supporting and insulating the main circuit conductor 2b, a shield 7b attached to the insulating spacer 6b, embedded electrodes 9b, 10b embedded in the insulating spacer 6b, a branch tube 5b, a lid 15b, and so on are shown, and an insulating spacer 6c supporting and insulating the main circuit conductor 2c, a shield 7c attached to the insulating spacer 6c, embedded electrodes 9c, 10c embedded in the insulating spacer 6c, a branch tube 5c, a lid 15c, and so on are shown.

A lid 17 is attached to the branch tube 16 by, e.g., a bolt or the like. The lid 17 seals against the metallic container 1. When the gas insulated bus is being assembled, with the lid 17 being detached, the operation of connecting the main circuit conductors 2a to 2c can be inspected visually through the branch tube 16 from outside the metallic container 1. The length along the direction of the axis line 3 of the shields 7a to 7c is preferably shorter than the inside diameter of the branch tube 16. This is because this means improves visibility at the time of connecting the main circuit conductors 2a to 2c and further improves the reliability of the assembly operation. The branch tube 16 is placed underneath the shield 7a for the main circuit conductor 2a, which shield is hung, e.g., from the top of the metallic container 1 so as to be supported.

According to the present embodiment, three phases of the main circuit conductors 2a to 2c are housed as one entity in the metallic container 1, and hence compared with a phase-separation-type configuration shown in Embodiment 1, the number of metallic containers 1 can be reduced.

According to the present embodiment, the arrangement of three phases of the main circuit conductors 2a to 2c inside the metallic container 1 forms, e.g., an equilateral triangle in a cross-section orthogonal to the axis line 3, and hence the distances between the main circuit conductors 2a to 2c are equal, so that insulation distances between the phases can be secured most effectively and that also electromagnet force at the time of between-phase short-circuiting can be lessened.

According to the present embodiment, the arrangement of three phases of the main circuit conductors 2a to 2c inside the metallic container 1 forms an equilateral triangle as mentioned above, and further, e.g., the equilateral triangle is placed with its one side being horizontal and one vertex being above that side. Hence, the main circuit conductors 2a to 2c can be placed as far from the bottom of the metallic container 1 as possible, where metallic foreign bodies may accumulate, so that the behavior of metallic foreign bodies under operation voltage can be suppressed. Note that three phases of the main circuit conductors 2a to 2c may be in an equilateral triangle arrangement other than the above one or an arrangement other than equilateral triangle arrangements.

According to the present embodiment, the branch tube 16 is provided underneath the shield 7a covering the main circuit conductor 2a, located at the apex of the equilateral triangle, of three phases of the main circuit conductors 2a to 2c in the metallic container 1, and hence metallic foreign bodies acting in the metallic container 1 under operation voltage can be effectively captured. Further, with the lid 17 being detached, the branch tube 16 acts as a manhole for visual inspection at the time of connecting the main circuit conductors 2a to 2c, thus improving assembly workability and reliability.

According to the present embodiment, the length along the direction of the axis line 3 of the shields 7a to 7c is shorter than, e.g., the inside diameter of the branch tube 16, hence improving visibility when viewing the connecting operation through the branch tube 16 while performing it at the time of connecting the main circuit conductors 2a to 2c. The other configurations, actions, and effects of the present embodiment are the same as in Embodiment 1 except, e.g., the relation of equation (1) that is characteristic of the phase-separation type.

Embodiment 3

Figure 10:
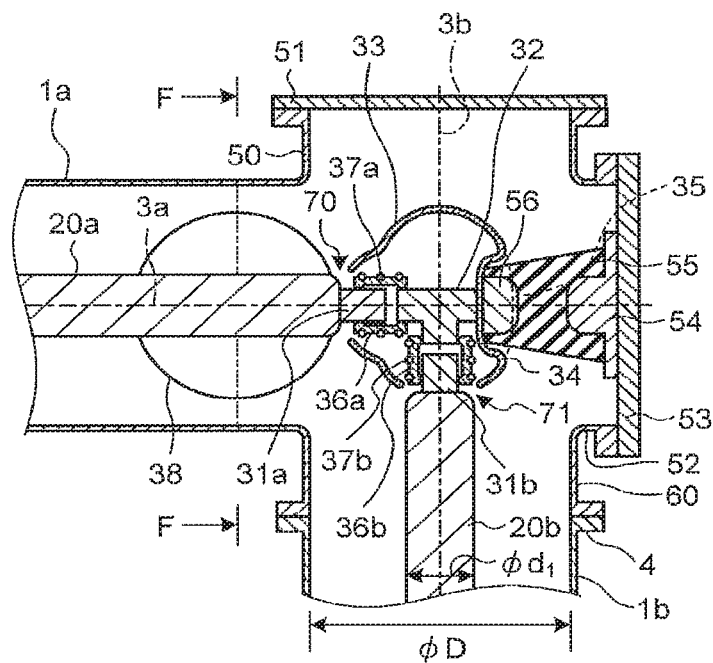
FIG. 10 is a detail view of portion D in FIG. 9 (a).
Figure 11:
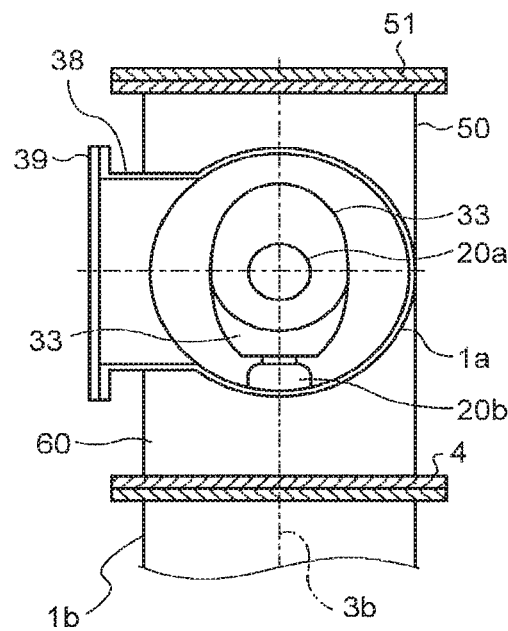
FIG. 11 is a cross-sectional view along line F-F in FIG. 10.
Figure 12:
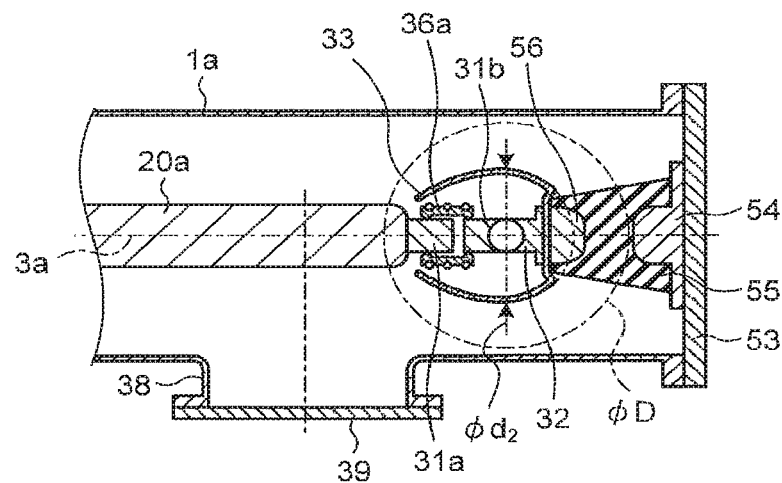
FIG. 12 is a detail view of portion E in FIG. 9 (b).

In this embodiment, an insulating support structure at a bend of the main circuit conductor will be described. FIGS. 9A and 9B longitudinal cross-sectional views of the gas insulated bus according to this embodiment; FIG. 9A is a top view; and FIG. 9B is a side view. FIG. 10 is a detail view of portion D in FIG. 9A; FIG. 11 is a cross-sectional view along line F-F in FIG. 10; and FIG. 12 is a detail view of portion E in FIG. 9B.

First, the schematic configuration of the present embodiment will be described with reference to FIG. 9. In FIG. 9, the same reference numerals are used to denote the same constituents as in FIG. 1. A main circuit conductor 20a is housed in a cylinder-shaped metallic container 1a. The metallic container 1a is placed with its longitudinal direction being, e.g., horizontal. The axis line 3a is the center axis of the main body of the metallic container 1a. The main circuit conductor 20a is, for example, annular in cross-section, and the outline of that cross-section is circular. The main circuit conductor 20a is provided extending parallel to the axis line 3a, and, for example, the center axis line of the main circuit conductor 20a coincides with the axis line 3a. The metallic container 1a is constituted by, e.g., a cylinder-shaped member with flanges 4 formed at its opposite ends, and a combined container is formed of a plurality of the cylinder-shaped members coupled in the direction of the axis line 3a (a first direction) by fastening them to each other with flanges 4. In FIG. 9, any of the metallic containers coupled in the direction of the axis line 3a is indicated by the same reference numeral 1a. To be exact, the metallic containers coupled in the direction of the axis line 3a are different in shape, for example, at their end or the like (e.g., a metallic container having a branch tube 16 formed thereon and one having a branch tube 38 formed thereon differ in shape at their end and the like), and hence different reference numerals should be used for them, but the same reference numeral 1a is used to indicate the metallic containers provided along the same direction of the axis line 3a for simplicity.

The metallic container 1a is provided, e.g., at two places with the insulating support structure described in Embodiment 1. That is, a branch tube 5 branching off, e.g., upward is provided on the side surface of the main body of the metallic container 1a, and an insulating spacer 6 of, e.g., a single-leg structure is attached to a lid sealing against the branch tube 5. A metal-made shield 7 shaped substantially like a barrel is attached to the tip of the insulating spacer 6. Further, a branch tube 16 branching off, e.g., downward is provided opposite the branch tube 5 on the side surface of the main body of the metallic container 1a. Details thereof are as described in Embodiment 1 and thus are omitted.

A branch tube 60 (a main-circuit branch tube) branching off from the side surface of the main body of the metallic container 1a is provided at an end 52 of the metallic container 1a. The axis line direction of the branch tube 60 is, e.g., a direction which is horizontal and substantially orthogonal to the direction of the axis line 3a. Further, a branch tube 50 is provided opposite the branch tube 60 with the axis line 3a in between, on the end 52 of the metallic container 1a. The branching-off direction of the branch tube 50 is, e.g., opposite to that of the branch tube 60.

The metallic container 1b is connected with the branch tube 60 of the metallic container 1a. The metallic container 1b is placed with its longitudinal direction being, e.g., horizontal. The axis line 3b that is the center axis of the main body of the metallic container 1b is, e.g., substantially orthogonal to the axis line 3a. That is, the metallic containers 1a and 1b are connected with their extending directions being substantially orthogonal to each other. The axis line direction of the branch tube 60 is substantially parallel to the direction of the axis line 3b (a second direction). The metallic container 1b is, e.g., the same in shape as the metallic container 1a. A main circuit conductor 20b is housed in the metallic container 1b. The main circuit conductor 20b is, for example, annular in cross-section, and the outline of that cross-section is circular. The main circuit conductor 20b is provided extending parallel to the axis line 3b, and, for example, the center axis line of the main circuit conductor 20b coincides with the axis line 3b. Thus, the extending direction of the main circuit conductor 20b and that of the main circuit conductor 20a are substantially orthogonal. An end of the main circuit conductor 20b and an end of the main circuit conductor 20b are connected inside the end 52 of the metallic container 1a. The connection of the main circuit conductors 20a and 20b is a place where their extending directions change (a bend). Hereinafter, the main circuit conductors 20a and 20b are collectively represented by the main circuit conductor 20. FIG. 9 shows an example of the arrangement configuration where the main circuit conductor 20 bends, e.g., like an L.

The bend of the main circuit conductor 20 is supported and insulated by an insulating spacer 55 of, e.g., a single-leg structure inside the end 52 of the metallic container 1a. An end of the insulating spacer 55 is fixed to the end 52 of the metallic container 1a, and a shield 33 is attached to the other end thereof. The shield 33 covers the bend of the main circuit conductor 20. The insulating spacer 55 may be, e.g., the same as the insulating spacer 6.

A branch tube 38 branching off downward (a bottom branch tube) is provided on the bottom of the main body of the metallic container 1a. The branch tube 38 is provided at a position farther from the end 52 than the position of the branch tube 60 along the direction of the axis line 3a. The axis line of the branch tube 38 is, e.g., substantially orthogonal to the axis line 3a. The metallic containers 1a and 1b are filled with an insulating gas such as $SF_6$ gas.

Next, the configuration of the present embodiment will be described in detail with reference to FIGS. 9A to 12. The portions D and E show details of the insulating support structure at the bend of the main circuit conductor 20.

As described above, the branch tubes 50 and 60 are provided at the end 52 of the metallic container 1a. The branch tube 50 is closed by a lid 51. The inside diameters of the branch tubes 50 and 60 can be made, e.g., smaller than or equal to the inside diameter $\phi D$ of the main body of the metallic container 1a. Because the branch tubes 50 and 60 are shorter in length than the metallic container 1a, forming the branch tubes 50 and 60 on the metallic container 1a is easier in machining when the inside diameters of the branch tubes 50 and 60 are smaller than or equal to that of the main body of the metallic container 1a than when the opposite is true.

A lid 53 is attached to the end 52 of the metallic container 1a by, e.g., a bolt or the like (not shown). The lid 53 seals against the metallic container 1a, and the insulating spacer 55 is attached to the lid 53. The insulating spacer 55 is, e.g., of a single-leg structure. The insulating spacer 55 is shaped, e.g., like a pillar, and its cross-section along a plane perpendicular to the longitudinal direction is, for example, circular. The insulating spacer 55 is placed, e.g., with its axis line direction being substantially parallel to the direction of the axis line 3a of the main body of the metallic container 1a. One end of the insulating spacer 55 has an embedded electrode 54 embedded therein, which is an embedded electrode on the metallic container side, and the embedded electrode 54 is fixed to the lid 53 by, e.g., a bolt or the like (not shown). That is, one end of the insulating spacer 55 is attached to the lid 53 that is part of the metallic container 1a via the embedded electrode 54.

At least part of the embedded electrode 54 is located outside the area, with the axis line 3b as the center, defined by the inside diameter of the branch tube 60. By this means, the electric field around the embedded electrode 54 is lessened. Placing the entire embedded electrode 54 outside the area, with the axis line 3b as the center, defined by the inside diameter of the branch tube 60 most lessens the electric field around the embedded electrode 54.

The other end of the insulating spacer 55 has an embedded electrode 56 embedded therein, which is an embedded electrode on the shield side. Further, the metal-made shield 33 is attached to the other end of the insulating spacer 55 via the embedded electrode 56. Specifically, the shield 33 is fixed to the embedded electrode 56 with use of, e.g., a bolt or the like (not shown).

The shield 33 has an opening 70 (a first opening) open in the direction of the axis line 3a and an opening 71 (a second opening) open in the direction of the axis line 3b, and is hollow inside and shaped substantially like a spindle or barrel in outline and covers the bend (connection) of the main circuit conductor 2.

The diameter of the opening 70 of the shield 33 is greater than, e.g., the outside diameter $\phi d_1$ of the main circuit conductor 20a. The outside diameter of the shield 33 is greater than the outside diameter $\phi d_1$ of the main circuit conductor 20a regardless of which position along the direction of the axis line 3a. The diameter of the opening 71 of the shield 33 is greater than, e.g., the outside diameter $\phi d_1$ of the main circuit conductor 20b. The outside diameter of the shield 33 is greater than the outside diameter $\phi d_1$ of the main circuit conductor 20b regardless of which position along the direction of the axis line 3b. Note that the outside diameter of the main circuit conductor 20a and that of the main circuit conductor 20b are set to be, e.g., equal, at $\phi d_1$. Although generally the electric field at the ends of the shield 33 and of the main circuit conductors 20a, 20b tends to be large, by shaping the shield 33 substantially like a spindle or barrel and making the outside diameter of the shield 33 greater than the outside diameter $\phi d_1$ of the main circuit conductors 20a, 20b, the equipotential lines are pushed outward to lessen the field concentration near the ends. Also, by shaping the shield 33 substantially like a spindle or barrel, the radius of curvature of its center becomes larger to lessen the electric field around the center. Further, the end on the opposite side of the axis line 3a from the opening 71 of the shield 33 is formed, e.g., in a sphere shape and thus is of a structure to lessen the electric field at the surface. Yet further, placing the branch tube 50 to be opposite that end of the shield 33 further lessens the electric field at the surface.

When compared in shape with the shield 7 of Embodiment 1, the shield 33 can be regarded as a shield obtained by smoothly bending the shield 7 at near its center along the axis direction such that one of the openings in opposite ends along the axis direction of the shield 7 faces the main circuit conductor 20a and that the other of the openings in the opposite ends faces in the direction of the main circuit conductor 20b, so that the opening 70 faces in the direction of the axis line 3a and that the opening 71 faces in the direction of the axis line 3b. Although the shield 33 has axis lines along two directions as above, the shield 33 can be said to be substantially in a barrel or spindle shape because its shape corresponds to a bent barrel- or spindle-like shape and swells out further at its center than at its ends.

A recess 34 is formed in part of the outer surface on the insulating spacer 55 side of the shield 33. With the other end of the insulating spacer 55 being placed in this recess 34, the insulating spacer 55 is placed being inserted into the shield 33. Thus, at least part of the embedded electrode 56 is placed in the recess 34. By placing at least part of the embedded electrode 56 in the recess 34 that is inward of the outline of the barrel- or spindle-like shape, the electric field around the embedded electrode 56 can be lessened. Note that the entire embedded electrode 56 can be placed in the recess 34. In this case, the electric field around the embedded electrode 56 is most lessened.

An adaptor conductor 32 is placed inside the shield 33. The adaptor conductor 32 is shaped substantially like an L in top view (FIG. 10) and has a first arm extending in the direction of the axis line 3a and a second arm extending in the direction of the axis line 3b, and is attached to the embedded electrode 56 via the recess 34 by, e.g., a bolt or the like (not shown). As to the adaptor conductor 32, the first arm corresponding to one side of the above L is parallel to the axis line 3a, and the second arm corresponding to the other side of the above L is parallel to the axis line 3b, and the adaptor conductor 32 bends likewise to match the bent axis line of the main circuit conductor 20. The adaptor conductor 32 is used to connect ends of the main circuit conductors 20a, 20b.

An end 31a of the main circuit conductor 20a is inserted into the shield 33 via the opening 70, with an end 31b of the main circuit conductor 20b being inserted into the shield 33 via the opening 71. The end 31a is, e.g., circular in the outline of its cross-section, and its outside diameter is smaller than, e.g., the outside diameter $\phi d_1$ of the main circuit conductor 20a. The end 31a extends in the direction of the axis line 3a. The end 31b is, e.g., circular in the outline of its cross-section, and its outside diameter is smaller than, e.g., the outside diameter $\phi d_1$ of the main circuit conductor 20b. The end 31b extends in the direction of the axis line 3b.

The end 31a of the main circuit conductor 20a inserted into the opening 70 of the shield 33 is connected with an end of the first arm of the adaptor conductor 32 via a contact maker 36a (a first contact maker). That end of the adaptor conductor 32 is of the same diameter as the end 31a. The end 31b of the main circuit conductor 20b inserted into the opening 71 of the shield 33 is connected with an end of the second arm of the adaptor conductor 32 via a contact maker 36b (a second contact maker). That end of the adaptor conductor 32 is of the same diameter as the end 31b. The contact maker 36a is a contact maker whose contact point with the end 31a of the main circuit conductor 20a is slidable along the direction of the axis line 3a and is a contact maker in, e.g., a tulip shape. In the example shown in the figure, the contact maker 36a is formed of multiple contact pieces arranged circumferentially and bound externally by a garter spring 37a, and the end 31a is pushed into the contact maker 36a to be electrically connected with the adaptor conductor 32. The contact maker 36b is a contact maker whose contact point with the end 31b of the main circuit conductor 20b is slidable along the direction of the axis line 3b and is a contact maker in, e.g., a tulip shape. In the example shown in the figure, the contact maker 36b is formed of multiple contact pieces arranged circumferentially and bound externally by a garter spring 37b, and the end 31b is pushed into the contact maker 36b to be electrically connected with the adaptor conductor 32. Thus, the substantially orthogonal ends 31a, 31b are electrically connected via, e.g., the contact makers 36a, 36b and the adaptor conductor 32.

Connecting the end 31a of the main circuit conductor 20a to the adaptor conductor 32 with use of the contact maker 36a makes the operation of connecting the main circuit conductor 20a easy. Likewise, connecting the end 31b of the main circuit conductor 20b to the adaptor conductor 32 with use of the contact maker 36b makes the operation of connecting the main circuit conductor 20b easy. Further, because the contact maker 36a is a contact maker whose contact point is slidable along the direction of the axis line 3a, even if the main circuit conductor 20a thermally expands and contracts in the direction of the axis line 3a, the end 31a in contact with the contact maker 36a will move according to the expansion and contraction of the main circuit conductor 20a, and thereby the expansion and contraction will be absorbed without excessive stress associated with the expansion and contraction being applied to the connection. Likewise, because the contact maker 36b is a contact maker whose contact point is slidable along the direction of the axis line 3b, even if the main circuit conductor 20b thermally expands and contracts in the direction of the axis line 3b, the end 31b in contact with the contact maker 36b will move according to the expansion and contraction of the main circuit conductor 20b, and thereby the expansion and contraction will be absorbed without excessive stress associated with the expansion and contraction being applied to the connection. Although the contact makers 36a, 36b become a heat source when current is applied, because the contact makers 36a, 36b are placed inside the barrel- or spindle-like shaped shield 33, the inner space and surface area of the shield 33 being broad improves radiation-ability, and thus the thermal effect of temperature increase on the main circuit conductors 20a, 20b can be reduced.

As such, the shield 33 holds the bend (connection) of the main circuit conductor 20 inside the metallic container 1a via the adaptor conductor 32 and the contact makers 36a, 36b. Also, the shield 33 covers the end 36a of the main circuit conductor 20a and the end 36b of the main circuit conductor 20b.

Note that the adaptor conductor 32 may be of an integral structure with the shield 33. While the shield 33 is made of, e.g., aluminum, if the adaptor conductor 32 is of an integral structure with the shield 33, the adaptor conductor 32 is also made of, e.g., aluminum. Where high current-carrying performance is required, the adaptor conductor 32 is preferably made of, e.g., copper that is more conductive. In this case, as shown in the figure, with the adaptor conductor 32 and the shield 33 being made separate parts, the shield 33 is made of, e.g., aluminum without a change in material, and only the adaptor conductor 32 should be made of, e.g., copper, resulting in a reduction in cost as well. Further, using the adaptor conductor 32 simplifies the connection structure with the contact makers 36a, 36b.

The outside diameter of the end 31a is set to be smaller than the outside diameter $\phi d_1$ of the main circuit conductor 20a. This is because by making the space between the opening 70 of the shield 33 and the main circuit conductor 20a wider, heat generated in the contact maker 36a when current is applied is more likely to escape outside the shield 33, thus further improving radiation-ability. The diameter of the opening 70 of the shield 33 is set to be greater than, e.g., the outside diameter $\phi d_1$ of the main circuit conductor 20a, which also produces the same effect. Likewise, the outside diameter of the end 31b is set to be smaller than the outside diameter $\phi d_1$ of the main circuit conductor 20b. This is because by making the space between the opening 71 of the shield 33 and the main circuit conductor 20b wider, heat generated in the contact maker 36b when current is applied is more likely to escape outside the shield 33, thus further improving radiation-ability. The diameter of the opening 71 of the shield 33 is set to be greater than, e.g., the outside diameter $\phi d_1$ of the main circuit conductor 20b, which also produces the same effect.

In the present embodiment, the insulating spacer 55 and the shield 33 are, in size, within the area defined by, e.g., the inside diameter ϕD of the metallic container 1a in a plan view viewed in the direction of the axis line 3a. By this means, after the insulating spacer 55 and the shield 33 are fit together outside the metallic container 1a, the insulating spacer 55 and the shield 33 can be carried through the end 52 of the metallic container 1a and installed inside the metallic container 1a, resulting in the assembly being easier.

It is preferable that the inside diameter ϕD, of the main body of the metallic container 1a or the branch tube 60, multiplied by 1/e, where e is the base of natural logarithm, is set to be greater than the outside diameter $\phi d_1$ of the main circuit conductor 20 and smaller than the maximum outside diameter $\phi d_2$ of the shield 33, that is, $$\phi d_1 < \phi D/e < \phi d_2. \tag{3}$$

This is, as described in Embodiment 1, because by setting the outside diameter $\phi d_1$ of the main circuit conductor 20 and the maximum outside diameter $\phi d_2$ of the shield 33 such that the diameter ϕD/e, at which the electric field magnitude is minimal, is sandwiched between them, the electric fields from the two can be made smaller in a balanced manner to reduce the maximum field value for the entire bus.

A lid 39 is attached to the branch tube 38 provided on the bottom of the metallic container 1a by, e.g., a bolt or the like (not shown). The lid 39 seals against the metallic container 1a. The branch tube 38 can capture metallic foreign bodies acting in the metallic container 1a under operation voltage. The branch tube 38 is provided adjacent to the branch tube 60 along the direction of the axis line 3a. Because a plurality of branch tubes (the branch tubes 50, 60) of the metallic container 1a are adjacent to each other at the bend of the main circuit conductor 20, it is difficult in terms of production to further provide the branch tube 38 on part of the bottom at the same position along the direction of the axis line 3a as that of the branch tubes 50, 60, which would compromise strength thereof as a pressure vessel, and hence the branch tube 38 is placed offset from the branch tubes 50, 60 along the direction of the axis line 3a. By this means, with being advantageous in terms of structure, strength thereof as a pressure vessel can be secured. When the gas insulated bus is assembled, with the lid 39 being detached, the branch tube 38 is used for visual inspection at the time of connecting the main circuit conductor 20a with the contact maker 36a and the main circuit conductor 20b with the contact maker 36b, and even with the branch tube 38 being offset as above, visual inspection of the two is easy, thus contributing to improvement in assembly workability and reliability.

Although the above description shows an example of the case where the axis lines 3a and 3b are substantially orthogonal, the present embodiment can be applied to the case where the axis lines 3a and 3b cross each other. In this case, the adaptor conductor 32 should take on a V-shape corresponding to the cross angle between the axis lines. Although in the above description the main circuit conductors 20a, 20b are connected, e.g., in a horizontal plane, not being limited to this, for example, the main circuit conductor 20b may be at an angle to a horizontal plane. For example, where the main circuit conductor 20b is connected to extend vertically upward with respect to the main circuit conductor 20a, the branch tube 60 faces upward, and the branch tube 50 faces downward. In this case, because with facing downward, the branch tube 50 can be used for capturing metallic foreign bodies as well as for visual inspection when the gas insulated bus is being assembled and lessening the electric field of the shield 33, a configuration without the branch tube 38 is possible. Although FIGS. 9A and 9B show an example where a bend is formed, e.g., at one place in the metallic container 1a, the same applies to the case where a bend is formed, e.g., at two places. For example, a configuration where the main circuit conductors 20a is bent at the left end in FIG. 9A is also possible.

As described above, according to the present embodiment, by setting the outside diameter of the shield 33 to be greater than that of the main circuit conductors 20a, 20b, the electric field concentrated at the ends of the shield 33 and of the main circuit conductors 20a, 20b can be lessened. Further, according to the present embodiment, by shaping the shield 33 substantially like a barrel or spindle, the electric field concentrated at the ends of the shield 33 and of the main circuit conductors 20a, 20b can be lessened. Yet further, according to the present embodiment, with the shield 33 being shaped substantially like a barrel or spindle, the radius of curvature of its center becomes larger to lessen the electric field around the center.

According to the present embodiment, because the insulating spacer 55 of a single leg is used, the insulating spacer 55 is simplified in structure as compared with spacers of a multi-leg structure such as a two-leg or three-leg structure or a conical spacer, thus improving assembly workability. Further, by using the insulating spacer 55 of a single leg, the surface area of the insulating spacer 55 is reduced as compared with spacers of multiple legs, and metallic foreign bodies are less likely to stick to the insulating spacer 55. Yet further, according to the present embodiment the insulating spacer 55 directly supports the bend of the main circuit conductor 20, which is high in the reliability of bearing strength and advantageous in terms of strength design. The insulating spacer being of a single-leg structure is the most suitable for directly supporting the bend of the main circuit conductor 20 with improving assembly workability.

According to the present embodiment, the insulating spacer 55 is placed with its axis line direction being substantially parallel to the main body of the metallic container 1a inside the end 52 of the main body of the metallic container 1a. As such, placing the insulating spacer 55 in a low electric field portion away from the path of the main circuit conductor 20a makes metallic foreign bodies less likely to come near to the insulating spacer 55. Further, without placing the insulating spacer 55 on the bottom, metallic foreign bodies are less likely to stick to the insulating spacer 55.

According to the present embodiment, the insulating spacer 55 and the shield 33 are, in size, within the area defined by, e.g., the inside diameter of the main body of the metallic container 1a in a plan view viewed in the direction of the axis line 3a, and hence after the insulating spacer 55 and the shield 33 are fit together outside the metallic container 1a, they can be installed inside the metallic container 1a, so that the ease of assembly is improved. Further, because the insulating spacer 55 and the shield 33 are fit together outside the metallic container 1a, cleaning and inspection after the assembly are easy to perform as compared with the case where they are fit together inside the metallic container 1a, and the possibility is reduced that metallic foreign bodies enter the metallic container 1a to adversely affect the insulation performance of the gas insulated bus.

According to the present embodiment, because the inside diameter of the branch tube 60 is set to be smaller than the inside diameter of the main body of the metallic container 1a, the production cost of the metallic container 1a can be reduced.

According to the present embodiment, at least part of the embedded electrode 56 on the shield 33 side is placed in the recess 34 that is inward of the outline 35 of the barrel- or spindle-like shape, and hence the electric field likely to be concentrated around the embedded electrode 56 can be lessened. As such, by providing the recess 34 in the swelling-out portion at the center of the barrel- or spindle-like shaped shield 33 and placing at least part of the embedded electrode 56 in the recess 34, the electric field around the embedded electrode 56 can be lessened, thus reducing the entire bus in size. Note that a configuration where the recess 34 is not formed in the shield 33 is also possible.

According to the present embodiment, at least part of the embedded electrode 54 on the metallic container 1a side is located outside the area, with the axis line 3b as the center, defined by the inside diameter of the branch tube 60, so that the electric field around the embedded electrode 54 is lessened.

According to the present embodiment, it is configured such that the end 31a of the main circuit conductor 20a is inserted through the opening 70 of the shield 33 into the shield 33, that the end 31b of the main circuit conductor 20b is inserted through the opening 71 of the shield 33 into the shield 33, that the main circuit conductor 20a is connected with the contact maker 36a slidable along the direction of the axis line 3a in the shield 33, and that the main circuit conductor 20b is connected with the contact maker 36b slidable along the direction of the axis line 3b in the shield 33, so that the operation of connecting the main circuit conductors 20a and 20b becomes easy. For example, the method that fixes the end 31a and the adaptor conductor 32 by a bolt requires an operation of fastening bolts in the metallic container 1a having much of a spatial restraint in terms of the assembly operation, but in the present embodiment, connection is easily made only by inserting the end 31a into the contact maker 36a. The same applies to the end 31b. Further, with the contact maker 36a being one whose contact point is slidable along the direction of the axis line 3a, thermal expansion and contraction in the direction of the axis line 3a of the main circuit conductor 20a can be absorbed in terms of size. The same applies to the contact maker 36b.

According to the present embodiment, it is configured such that the adaptor conductor 32, bent as the main circuit conductor 20 is, is placed in the shield 33, that the adaptor conductor 32 and the main circuit conductor 20a are connected via the contact maker 36a, and that the adaptor conductor 32 and the main circuit conductor 20b are connected via the contact maker 36b, so that the connection structure of the contact makers 36a and the contact makers 36b is simplified. Further, the adaptor conductor 32 and the shield 33 being made separate parts is suitable also for the case where the adaptor conductor 32 and the shield 33 need to be made of different materials.

Figure 13:
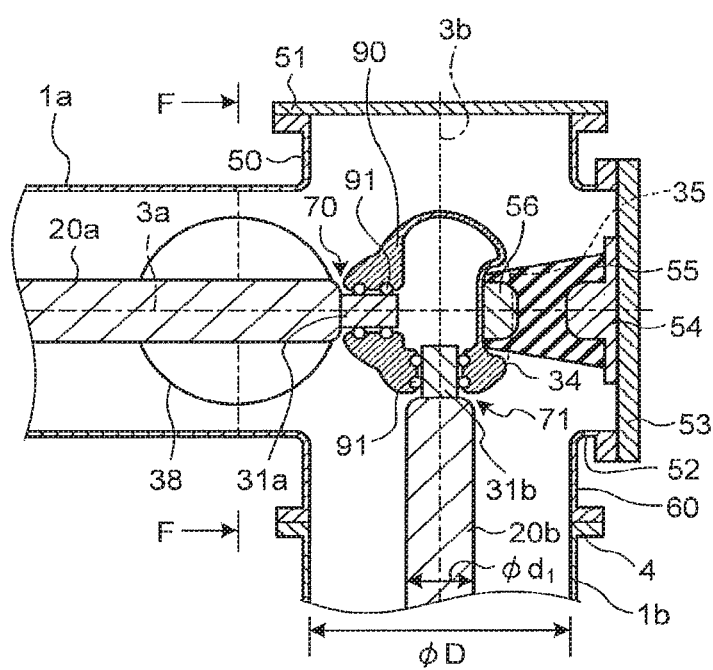
FIG. 13 is a diagram showing another connection configuration of ends of main circuit conductors in Embodiment 3.
Figure 14:
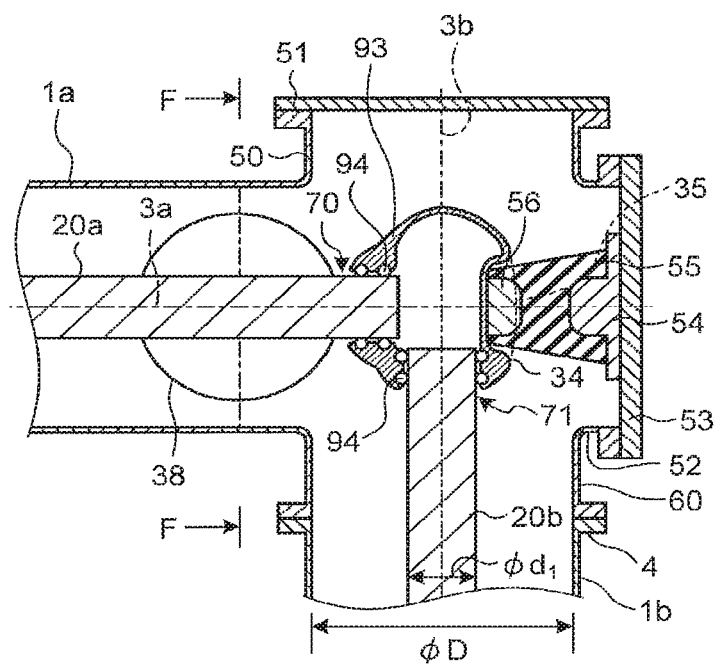
FIG. 14 is a diagram showing yet another connection configuration of ends of main circuit conductors in Embodiment 3.

A configuration is also possible where the main circuit conductors 20a, 20b are connected without using the adaptor conductor 32. FIG. 13 shows another connection configuration of the main circuit conductors 20a, 20b. As shown in FIG. 13, the shield 90 is the same as the shield 33 in that it has an outline in a barrel- or spindle-like shape and has a recess 34 formed in part of its outer surface, but differs in inner shape from the shield 33, and the opening 70 of the shield 90 is cylindrical. Multiple annular grooves are formed in the inner circumferential surface of the end of the shield 90 provided with the opening 70, and a coil spring contact 91, e.g., annular is placed in the each groove. Likewise, the opening 71 of the shield 90 is cylindrical. Multiple annular grooves are formed also in the inner circumferential surface of the end of the shield 90 provided with the opening 71, and a coil spring contact 91, e.g., annular is placed in the each groove. Note that the number of coil spring contacts 91 provided is not limited to that of the example shown in the figure. Not being limited to the coil spring contact 91, another band-shaped contact to cover substantially the entire circumference of the end 31a, 31b so as to produce the same effect may be used. As with a shield 93 of FIG. 14, the outside diameter of the end 20a of the main circuit conductors 20a may be set to be the same as the outside diameter $\phi d_1$ of the main circuit conductor 20a, and the outside diameter of the end 20b of the main circuit conductors 20b may be set to be the same as the outside diameter $\phi d_1$ of the main circuit conductor 20b, and the inside diameter of the coil spring contact 94 may be made larger. In this case, the shape of the ends of the main circuit conductors 20a, 20b can be simplified, and the thermal effect due to temperature increase on the coil spring contact 94 can be reduced.

In the present embodiment, the diameter of the end 31a of the main circuit conductor 20a to be connected with the contact maker 36a is set to be smaller than the diameter $\phi d_1$ of part other than the end 31a of the main circuit conductor 20a, and the diameter of the end 31b of the main circuit conductor 20b to be connected with the contact maker 36b is set to be smaller than the diameter $\phi d_1$ of part other than the end 31b of the main circuit conductor 20b. With this configuration, the space between the opening 70 of the shield 33 and the main circuit conductor 20a and the space between the opening 71 of the shield 33 and the main circuit conductor 20b become larger, and heat generated in the contact maker 36a, 36b when current is applied can be effectively radiated outside the shield 33. Thus, the current-carrying performance of the main circuit conductors 20a, 20b can be prevented from decreasing.

In the present embodiment, the diameter of the opening 70 of the shield 33 is set to be greater than the outside diameter of the main circuit conductor 20a, and the diameter of the opening 71 of the shield 33 is set to be greater than the outside diameter of the main circuit conductor 20b. By this means, the space between the opening 70 of the shield 33 and the main circuit conductor 20a and the space between the opening 71 of the shield 33 and the main circuit conductor 20b become larger, thus producing the same effect as above, and even if part of the main circuit conductor 20a other than the end 31a comes near to the opening 70 at the time of assembly or thermal expansion due to the application of current, or even if part of the main circuit conductor 20b other than the end 31b comes near to the opening 71 at the time of assembly or thermal expansion due to the application of current, the main circuit conductor 20a, 20b and the shield 33 will not come into contact to be damaged, and thus this means contributes to improvement in reliability.

According to the present embodiment, it is configured such that, e.g., the above equation (3) is satisfied, and hence a balance between the electric field at the surface of the main circuit conductors 20a, 20b and the electric field at the surface of the shield 33 (insulation coordination) can be achieved, and the diameter of the metallic containers 1a, 1b can be optimized to be shrunk.

According to the present embodiment, the branch tube 38 is provided, e.g., on the bottom of the inside of the metallic container 1a, and hence metallic foreign bodies acting in the metallic container 1a under operation voltage are allowed to fall into the branch tube 38 to be captured. Because, with the outside diameter of the shield 33 being greater than that of the main circuit conductor 20a, the electric field becomes higher in the vicinity of the shield 33, metallic foreign bodies act furiously and are more likely to approach the shield 33, and hence it is effective in capturing metallic foreign bodies to provide the branch tube 38 underneath the shield 7. The branch tube 38 is placed on the opposite side of the bend from the end 52 of the metallic container 1a, and when the gas insulated bus is assembled, with the lid 39 being detached, visual inspection through the branch tube 38 is easy at the time of connecting the main circuit conductor 20a with the contact maker 36a and at the time of connecting the main circuit conductor 20b with the contact maker 36b, and so the branch tube 38 is useful as a manhole for visual inspection. Further, because the branch tube 38 is provided at a position offset in the direction of the axis line 3a from the end 52 where a plurality of branch tubes 50, 60 are formed adjacent to each other, difficulty in configuration is eliminated, and strength thereof as a pressure vessel is secured as compared with the case where the branch tube 38 is provided at the same position along the direction of the axis line 3a as the branch tubes 50, 60. Thus, the branch tube 38 contributes to improvement in assembly workability and reliability.

Although in this embodiment the axis lines of the main circuit conductors 20a, 20b and the axis lines 3a, 3b coincide respectively, they can be placed to be offset from each other.

Although in the present embodiment an example where, e.g., one phase worth of a main circuit conductor is housed in a metallic container has been described, the same applies to the case where three phases worth of main circuit conductors are housed as one entity in a metallic container. The three-phase entity type is as described in Embodiment 2. In the three-phase entity type, three phases worth of insulating spacers are provided upright on the lid 53 and parallel to, e.g., the axis line 3a. One or two phases of the three phases may be provided upright on the lid 51 and parallel to, e.g., the axis line 3b. With the three-phase entity type, the number of tanks (metallic containers) is reduced. Further, as described in Embodiment 2, arrangement can be made such that the three phase arrangement of main circuit conductors forms an equilateral triangle. In this case, with the distances between the main circuit conductors being equal, electromagnet force at the time of a between-phase short-circuiting accident can be lessened.

Embodiment 4

Figure 16:
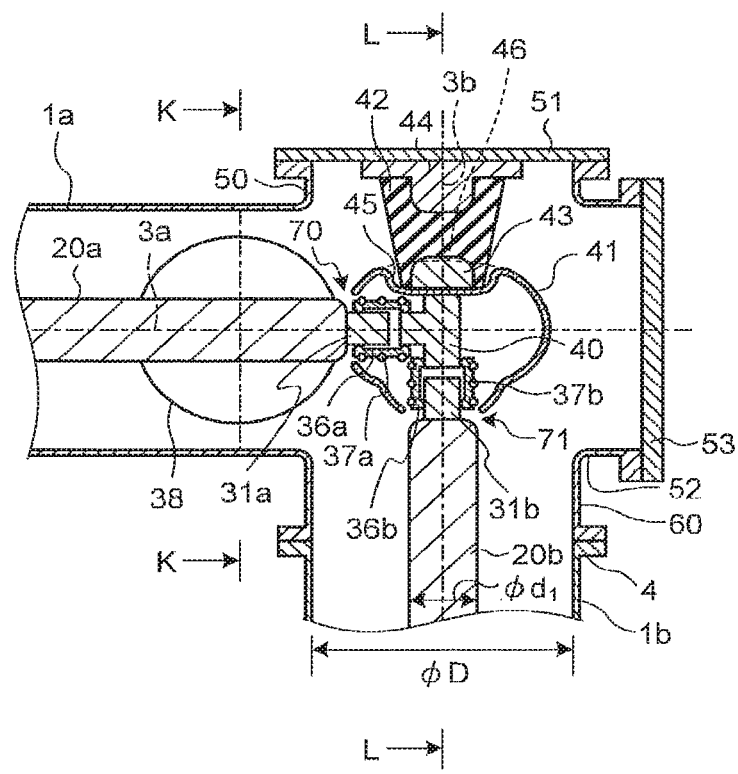
FIG. 16 is a detail view of portion G in FIG. 15 (a).
Figure 17:
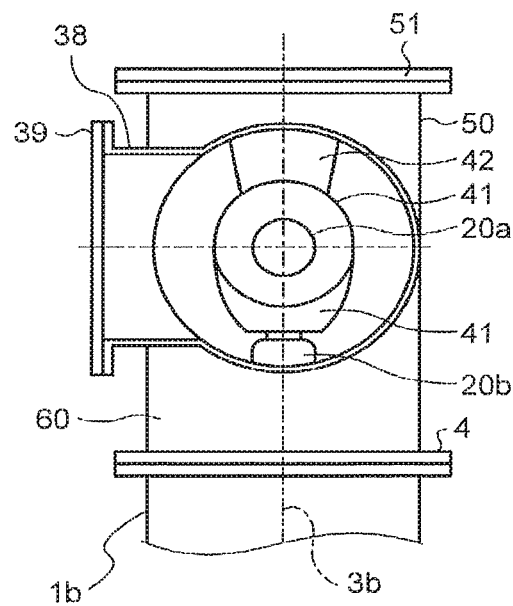
FIG. 17 is a cross-sectional view along line K-K in FIG. 16.
Figure 18:
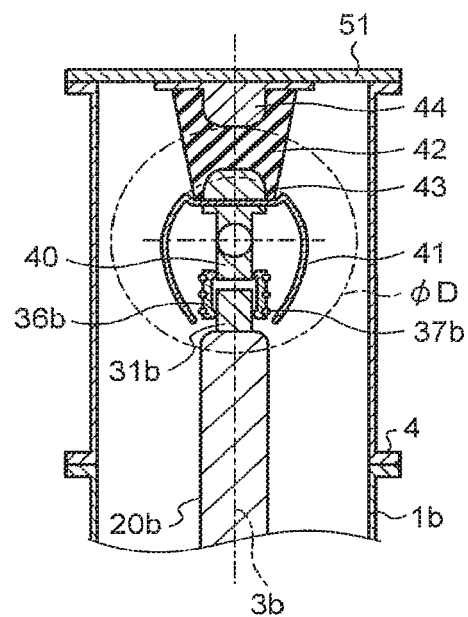
FIG. 18 is a cross-sectional view along line L-L in FIG. 16.
Figure 19:
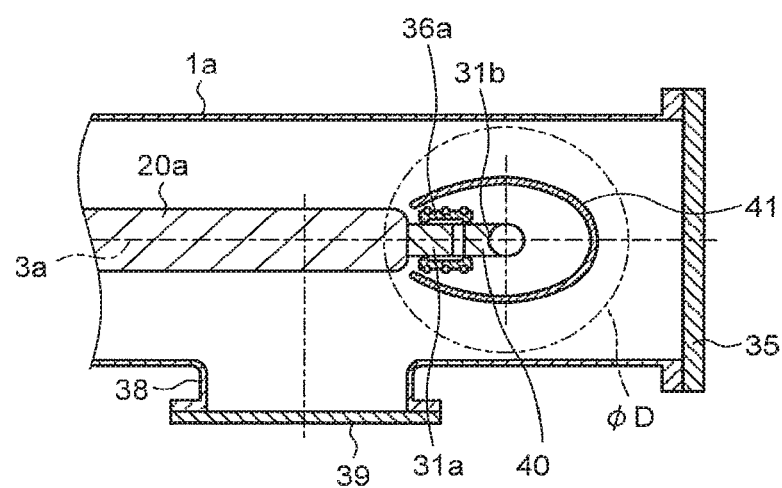
FIG. 19 is a detail view of portion H in FIG. 15 (*b*).

In this embodiment, an insulating support structure at a bend of the main circuit conductor will be described as in Embodiment 3. FIGS. 15A and 15B are longitudinal cross-sectional views of the gas insulated bus according to this embodiment; FIG. 15A is a top view; and FIG. 15B is a side view. FIG. 16 is a detail view of portion G in FIG. 15A; FIG. 17 is a cross-sectional view along line K-K in FIG. 16; FIG. 18 is a cross-sectional view along line L-L in FIG. 16; and FIG. 19 is a detail view of portion H in FIG. 15B. In FIGS. 15 to 19, the same reference numerals are used to denote the same constituents as in FIGS. 9A to 12 with detailed description thereof being omitted, and description will be made below focusing on the differences from Embodiment 3 and of related matters as well. Also in FIGS. 15A and 15B, any of the metallic containers coupled in the direction of the axis line 3a is indicated by the same reference numeral 1a. To be exact, the metallic containers coupled in the direction of the axis line 3a are different in shape, for example, at their end or the like (e.g., a metallic container having a branch tube 16 formed thereon and one having a branch tube 38 formed thereon differ in shape at their end or the like), and hence different reference numerals should be used for them, but the same reference numeral 1a is used to indicate the metallic containers provided along the same direction of the axis line 3a for simplicity.

As shown in FIGS. 15A to 19, in the present embodiment, a bend of the main circuit conductor 20 is supported and insulated by an insulating spacer 42 inside the end 52 of the metallic container 1a. Note that the main circuit conductors 20a and 20b are collectively represented by the main circuit conductor 20. An end of the insulating spacer 42 is placed in the branch tube 50 (an insulating-spacer fixing branch tube) and fixed to the metallic container 1a, and a shield 41 is attached to the other end thereof. The shield 41 covers the bend of the main circuit conductor 20. The insulating spacer 42 may be, e.g., the same as the insulating spacers 6, 55.

A lid 51 is attached to the branch tube 50 by, e.g., a bolt or the like (not shown). The lid 51 seals against the metallic container 1a, and the insulating spacer 42 is attached at one end to the lid 51. The insulating spacer 42 is, e.g., of a single-leg structure. The insulating spacer 42 is shaped, e.g., like a pillar, and its cross-section along a plane perpendicular to the longitudinal direction is, for example, circular. The insulating spacer 42 is placed with its axis line direction being substantially parallel to the axis line direction of the branch tube 60, which is a main-circuit branch tube, and substantially parallel to the direction of the axis line 3b.

The inside diameter of the branch tube 50 can be made smaller than or equal to the inside diameter ϕD of the main body of the metallic container 1a. Because the branch tube 50 is shorter in length than the metallic container 1a, forming the branch tube 50 on the metallic container 1a is easier in machining when the inside diameter of the branch tube 50 is smaller than or equal to that of the main body of the metallic container 1a than when the opposite is true. In the example shown in the figure, the inside diameter of the branch tube 50 is set equal to, e.g., the inside diameter ϕD of the main body of the metallic containers 1a, 1b.

One end of the insulating spacer 42 has an embedded electrode 44 embedded therein, which is an embedded electrode on the metallic container side, and the embedded electrode 44 is fixed to the lid 51 by, e.g., a bolt or the like (not shown). That is, one end of the insulating spacer 42 is attached to the lid 51 that is part of the metallic container 1a via the embedded electrode 44.

At least part of the embedded electrode 44 is located outside the area, with the axis line 3a as the center, defined by the inside diameter of the main body of the metallic containers 1a. By this means, the electric field around the embedded electrode 44 is lessened. Placing the entire embedded electrode 44 outside the area, with the axis line 3a as the center, defined by the inside diameter of the inside diameter of the main body of the metallic container 1a most lessens the electric field around the embedded electrode 44.

The other end of the insulating spacer 42 has an embedded electrode 43 embedded therein, which is an embedded electrode on the shield side. Further, a metal-made shield 41 is attached to the other end of the insulating spacer 42 via the embedded electrode 43. Specifically, the shield 41 is fixed to the embedded electrode 43 with use of, e.g., a bolt or the like (not shown).

The shield 41 has an opening 70 open in the direction of the axis line 3a and an opening 71 open in the direction of the axis line 3b, and is hollow inside and shaped substantially like a spindle or barrel in outline and covers the bend (connection) of the main circuit conductor 20.

The diameter of the opening 70 of the shield 41 is greater than, e.g., the outside diameter $\phi d_1$ of the main circuit conductor 20a. The outside diameter of the shield 41 is greater than the outside diameter $\phi d_1$ of the main circuit conductor 20a regardless of which position along the direction of the axis line 3a. The diameter of the opening 71 of the shield 41 is greater than, e.g., the outside diameter $\phi d_1$ of the main circuit conductor 20b. The outside diameter of the shield 41 is greater than the outside diameter $\phi d_1$ of the main circuit conductor 20b regardless of which position along the direction of the axis line 3b. Although generally the electric field at the ends of the shield 41 and of the main circuit conductors 20a, 20b tends to be large, by shaping the shield 41 substantially like a spindle or barrel and making the outside diameter of the shield 41 greater than the outside diameter $\phi d_1$ of the main circuit conductors 20a, 20b, the equipotential lines are pushed outward to lessen the field concentration near the ends. Also, by shaping the shield 41 shaped substantially like a spindle or barrel, the radius of curvature of its center becomes larger to lessen the electric field around the center.

A recess 45 is formed in part of the outer surface on the insulating spacer 42 side of the shield 41. With the other end of the insulating spacer 42 being placed in this recess 45, the insulating spacer 42 is placed being inserted into the shield 41. Thus, at least part of the embedded electrode 43 is placed in the recess 45. By placing at least part of the embedded electrode 43 in the recess 45 that is inward of the outline of the barrel- or spindle-like shape, the electric field around the embedded electrode 43 can be lessened. Note that the entire embedded electrode 43 can be placed in the recess 45. In this case, the electric field around the embedded electrode 43 is most lessened. When compared in shape with the shield 33 of Embodiment 3, the shield 41 differs in shape in that the forming position of the recess 45 differs correspondingly to the attachment position of the insulating spacer 42 differing, but is substantially the same in shape other than that and has the same function.

An adaptor conductor 40 is placed inside the shield 41. The adaptor conductor 40 is shaped substantially like an L in top view (FIG. 16) and is attached to the embedded electrode 43 via the recess 45 by, e.g., a bolt or the like (not shown). The adaptor conductor 40 has a first arm parallel to the axis line 3a and a second arm parallel to the axis line 3b. The adaptor conductor 40 is used to connect ends of the main circuit conductors 20a, 20b. Note that the adaptor conductor 40 may be of an integral structure with the shield 41, as described in Embodiment 3.

An end 31a of the main circuit conductor 20a is inserted into the shield 41 via the opening 70, and also an end 31b of the main circuit conductor 20b is inserted into the shield 33 via the opening 71. The end 31a of the main circuit conductor 20a inserted into the opening 70 of the shield 41 is connected with an end of the first arm of the adaptor conductor 40 via a contact maker 36a. The end 31b of the main circuit conductor 20b inserted into the opening 71 of the shield 41 is connected with an end of the second arm of the adaptor conductor 40 via a contact maker 36b. As described in Embodiment 3, the contact maker 36a is a contact maker whose contact point with the end 31a of the main circuit conductor 20a is slidable along the direction of the axis line 3a and is a contact maker in, e.g., a tulip shape. In the example shown in the figure, the contact maker 36a is formed of multiple contact pieces arranged circumferentially and bound externally by a garter spring 37a, and the end 31a is pushed into the contact maker 36a to be electrically connected with the adaptor conductor 40. The contact maker 36b is a contact maker whose contact point with the end 31b of the main circuit conductor 20b is slidable along the direction of the axis line 3b and is a contact maker in, e.g., a tulip shape. In the example shown in the figure, the contact maker 36b is formed of multiple contact pieces arranged circumferentially and bound externally by a garter spring 37b, and the end 31b is pushed into the contact maker 36b to be electrically connected with the adaptor conductor 40.

In the present embodiment, the insulating spacer 42 and the shield 41 are, in size, within the area defined by, e.g., the inside diameter of the branch tube 50 in a plan view viewed in the axis line direction of the branch tube 50 (the axis line 3b direction). By this means, after the insulating spacer 42 and the shield 41 are fit together outside the metallic container 1a, the insulating spacer 42 and the shield 41 can be carried through the branch tube 50 and installed inside the metallic container 1a, resulting in the assembly being easier.

The rest of the configuration of the present embodiment is the same as in Embodiment 3. For example, the relations in size and extending direction between their constituents and so on are the same.

As described above, according to the present embodiment, by setting the outside diameter of the shield 41 to be greater than that of the main circuit conductors 20a, 20b, the electric field concentrated at the ends of the shield 41 and of the main circuit conductors 20a, 20b can be lessened. Further, according to the present embodiment, by shaping the shield 41 substantially like a barrel or spindle, the electric field concentrated at the ends of the shield 41 and of the main circuit conductors 20a, 20b can be lessened. Yet further, according to the present embodiment, with the shield 41 being shaped substantially like a barrel or spindle, the radius of curvature of its center becomes larger to lessen the electric field around the center.

According to the present embodiment, because the insulating spacer 42 of a single leg is used, the insulating spacer 42 is simplified in structure as compared with spacers of a multi-leg structure such as a two-leg or three-leg structure or a conical spacer, thus improving assembly workability. Further, by using the insulating spacer 42 of a single leg, the surface area of the insulating spacer 42 is reduced as compared with spacers of multiple legs, and metallic foreign bodies are less likely to stick to the insulating spacer 42. Yet further, according to the present embodiment the insulating spacer 42 directly supports the bend of the main circuit conductor 20, which is high in the reliability of bearing strength and advantageous in terms of strength design. The insulating spacer being of a single-leg structure is the most suitable for directly supporting the bend of the main circuit conductor 20 with improving assembly workability.

According to the present embodiment, the branch tube 50 is provided opposite the branch tube 60 with the axis line 3a of the main body of the metallic container 1a in between, and with its one end being placed in the branch tube 50, the insulating spacer 42 is placed, e.g., with its axis line direction being substantially parallel to the axis line direction of the branch tube 60, which is a main-circuit branch tube. As such, placing the insulating spacer 42 in a low electric field portion away from the path of the main circuit conductor 20a makes metallic foreign bodies less likely to come near to the insulating spacer 42. Further, without placing the insulating spacer 42 on the bottom, metallic foreign bodies are less likely to stick to the insulating spacer 42.

According to the present embodiment, the insulating spacer 42 and the shield 41 are, in size, within the area defined by the inside diameter of the branch tube 50 in a plan view viewed in the axis line direction of the branch tube 50 (the axis line 3b direction), and hence after the insulating spacer 42 and the shield 41 are fit together outside the metallic container 1a, they can be installed inside the metallic container 1a, so that the ease of assembly is improved. Further, because the insulating spacer 42 and the shield 41 are fit together outside the metallic container 1a, cleaning and inspection after the assembly are easy to perform as compared with the case where they are fit together inside the metallic container 1a, and the possibility is reduced that metallic foreign bodies enter the metallic container 1a to adversely affect the insulation performance of the gas insulated bus.

According to the present embodiment, because the inside diameter of the branch tube 50 is set to be smaller than the inside diameter of the main body of the metallic container 1a, the production cost of the metallic container 1a can be reduced.

According to the present embodiment, at least part of the embedded electrode 43 on the shield 41 side is placed in the recess 45 that is inward of the outline of the barrel- or spindle-like shape, and hence the electric field likely to be concentrated around the embedded electrode 43 can be lessened. As such, by providing the recess 45 in the swelling-out portion at the center of the barrel- or spindle-like shaped shield 41 and placing at least part of the embedded electrode 43 in the recess 45, the electric field around the embedded electrode 43 can be lessened, thus reducing the entire bus in size. Note that a configuration where the recess 45 is not formed in the shield 41 is also possible.

According to the present embodiment, at least part of the embedded electrode 44 is located outside the area, with the axis line 3a as the center, defined by the inside diameter of the main body of the metallic container 1a, so that the electric field around the embedded electrode 44 is lessened.

According to the present embodiment, it is configured such that the end 31a of the main circuit conductor 20a is inserted through the opening 70 of the shield 41 into the shield 41, that the end 31b of the main circuit conductor 20b is inserted through the opening 71 of the shield 41 into the shield 41, that the main circuit conductor 20a is connected with the contact maker 36a slidable along the direction of the axis line 3a in the shield 41, and that the main circuit conductor 20b is connected with the contact maker 36b slidable along the direction of the axis line 3b in the shield 41, so that the operation of connecting the main circuit conductors 20a and 20b becomes easy. For example, the method that fixes the end 31a and the adaptor conductor 40 by a bolt requires an operation of fastening bolts in the metallic container 1a having much of a spatial restraint in terms of the assembly operation, but in the present embodiment, connection is easily made only by inserting the end 31a into the contact maker 36a. The same applies to the end 31b. Further, with the contact maker 36a being one whose contact point is slidable along the direction of the axis line 3a, thermal expansion and contraction in the direction of the axis line 3a of the main circuit conductor 20a can be absorbed in terms of size. The same applies to the contact maker 36b.

According to the present embodiment, it is configured such that the adaptor conductor 40, bent as the main circuit conductor 20 is, is placed in the shield 41, that the adaptor conductor 40 and the main circuit conductor 20a are connected via the contact maker 36a, and that the adaptor conductor 40 and the main circuit conductor 20b are connected via the contact maker 36b, so that the connection structure of the contact makers 36a and the contact makers 36b is simplified. Further, the adaptor conductor 40 and the shield 41 being made separate parts is suitable for the case where the adaptor conductor 40 and the shield 41 need to be made of different materials. Note that as described with reference to FIGS. 13, 14 in Embodiment 3, a configuration is also possible where the main circuit conductors 20a, 20b are connected without using the adaptor conductor 40.

In the present embodiment, the diameter of the end 31a of the main circuit conductor 20a to be connected with the contact maker 36a is set to be smaller than the diameter $\phi d_1$ of part other than the end 31a of the main circuit conductor 20a, and the diameter of the end 31b of the main circuit conductor 20b to be connected with the contact maker 36b is set to be smaller than the diameter $\phi d_1$ of part other than the end 31b of the main circuit conductor 20b. With this configuration, the space between the opening 70 of the shield 41 and the main circuit conductor 20a and the space between the opening 71 of the shield 41 and the main circuit conductor 20b become larger, and heat generated in the contact maker 36a, 36b when current is applied can be effectively radiated outside the shield 41. Thus, the current-carrying performance of the main circuit conductors 20a, 20b can be prevented from decreasing.

In the present embodiment, the diameter of the opening 70 of the shield 41 is set to be greater than the outside diameter of the main circuit conductor 20a, and the diameter of the opening 71 of the shield 41 is set to be greater than the outside diameter of the main circuit conductor 20b. By this means, the space between the opening 70 of the shield 41 and the main circuit conductor 20a and the space between the opening 71 of the shield 41 and the main circuit conductor 20b become larger, thus producing the same effect as above, and even if part of the main circuit conductor 20a other than the end 31a comes near to the opening 70 at the time of assembly or thermal expansion due to the application of current, or even if part of the main circuit conductor 20b other than the end 31b comes near to the opening 71 at the time of assembly or thermal expansion due to the application of current, the main circuit conductor 20a, 20b and the shield 41 will not come into contact to be damaged, and thus this means contributes to improvement in reliability.

In the present embodiment, as in Embodiment 3, it can be configured such that, e.g., the above equation (3) is satisfied. By this means, a balance between the electric field at the surface of the main circuit conductors 20a, 20b and the electric field at the surface of the shield 41 (insulation coordination) can be achieved, and the diameter of the metallic containers 1a, 1b can be optimized to be shrunk.

According to the present embodiment, the branch tube 38 is provided, e.g., on the bottom of the inside of the metallic container 1a, and hence metallic foreign bodies acting in the metallic container 1a under operation voltage are allowed to fall into the branch tube 38 to be captured. Because, with the outside diameter of the shield 41 being greater than that of the main circuit conductor 20a, the electric field becomes higher in the vicinity of the shield 41, metallic foreign bodies act furiously and are more likely to approach the shield 41, and hence it is effective in capturing metallic foreign bodies to provide the branch tube 38 underneath the shield 41. The branch tube 38 is placed on the opposite side of the bend from the end 52 of the metallic container 1a, and when the gas insulated bus is assembled, with the lid 39 being detached, visual inspection through the branch tube 38 is easy at the time of connecting the main circuit conductor 20a with the contact maker 36a and at the time of connecting the main circuit conductor 20b with the contact maker 36b, and so the branch tube 38 is useful as a manhole for visual inspection. Further, because the branch tube 38 is provided at a position offset in the direction of the axis line 3a from the end 52 where a plurality of branch tubes 50, 60 are formed adjacent to each other, difficulty in configuration is eliminated, and strength thereof as a pressure vessel is secured as compared with the case where the branch tube 38 is provided at the same position along the direction of the axis line 3a as the branch tubes 50, 60. Thus, the branch tube 38 contributes to improvement in assembly workability and reliability.

The other effects of the present embodiment are the same as in Embodiment 3.

INDUSTRIAL APPLICABILITY

As described above, the present invention is useful as a gas insulated bus.

REFERENCE SIGNS LIST

1 Metallic container
2, 2a-2c Main circuit conductor
3 Axis line
4 Flange
5, 5a-5c, 16 Branch tube
6, 6a-6c Insulating spacer
7, 7a-7c, 27, 27b Shield
8, 8a Recess
9, 9a-9c, 10, 10a-10c Embedded electrode
11, 11a Opening
12, 12a Adaptor conductor
13, 13a Contact maker
14, 14a Garter spring
15, 15a-15c, 17 Lid
18, 18a Annular portion
19, 19a Guard portion
22, 22a End
28 Coil spring contact
29 Area
1a, 1b Metallic container
3a, 3b Axis line
20a, 20b Main circuit conductor
31a, 31b, 52 End
32, 40 Adaptor conductor
33, 41, 90, 93 Shield
34, 45 Recess
36a, 36b Contact maker
37a, 37b Garter spring
38, 50, 60 Branch tube
39, 51, 53 Lid
42, 55 Insulating spacer
43, 44, 54, 56 Embedded electrode
70, 71 Opening
91, 94 Coil spring contact

The invention claimed is:

1. A gas insulated bus comprising:
a first cylinder-shaped metallic container filled with an insulating gas and an axis line of whose main body extends in a first direction;
a first main circuit conductor provided extending parallel to the first direction in the first metallic container and the outline of whose cross-section is circular;
a second cylinder-shaped metallic container filled with the insulating gas and an axis line of whose main body extends in a second direction crossing the first direction, an end of the second metallic container being connected with an end of the first metallic container;
a second main circuit conductor provided extending parallel to the second direction in the second metallic container and electrically connected to the first main circuit conductor inside the end of the first metallic container and the outline of whose cross-section is circular;
an insulating spacer of a single-leg structure provided inside the end of the first metallic container and whose one end is fixed to the first metallic container and an other end of which is indirectly attached to a connection portion of the first main circuit conductor and the second main circuit conductor, the insulating spacer supporting and insulating the connection portion inside the first metallic container; and
a metal-made shield attached to the other end of the insulating spacer and provided with a first opening proximate the first main circuit conductor and open in the first direction, and provided with a second opening proximate the second main circuit conductor and open in the second direction, the shield covering the connection portion, the shield being substantially in a barrel or spindle shape having an outside diameter greater than the outside diameter of the first main circuit conductor and the second main circuit conductor, wherein
the end of the first metallic container is provided with a main-circuit branch tube to be connected with the end of the second metallic container, and
an axis line of the main-circuit branch tube is substantially parallel to the second direction, wherein a direction of the axis line of the main-circuit branch tube is substantially orthogonal to the first direction, and wherein
a recess is formed in part of the outer surface of the shield,
a bottom of the recess is provided on the axis line of the main body extending in the first direction,
the insulating spacer is provided on the axis line of the main body extending in the first direction,
an embedded electrode on the metallic container side is embedded in the one end of the insulating spacer, and
at least part of the embedded electrode on the metallic container side is placed outside an area defined by the inside diameter of the main-circuit branch tube in a plan view viewed in the second direction.

2. The gas insulated bus according to claim 1, wherein the insulating spacer is placed with an axis line thereof being substantially parallel to the first direction.

3. The gas insulated bus according to claim 2, wherein the insulating spacer and the shield are, in size, within an area defined by the inside diameter of the main body of the first metallic container in a plan view viewed in the first direction.

4. The gas insulated bus according to claim 1, wherein the inside diameter of the main-circuit branch tube is smaller than or equal to the inside diameter of the main body of the first metallic container.

5. The gas insulated bus according to claim 1, wherein one phase worth of the first and second main circuit conductors are respectively housed in the first and second metallic containers, and
wherein the inside diameter of the main body of the first metallic container or the inside diameter of the main-circuit branch tube, multiplied by 1/e, where e is the base of natural logarithm, is greater than the outside diameter of the first main circuit conductor and smaller than the maximum outside diameter of the shield.

6. The gas insulated bus according to claim 1, wherein a bottom branch tube is provided on the bottom of the main body of the first metallic container and branches off downward at a position apart from the end of the first metallic container along the first direction than the position of the main-circuit branch tube.

7. The gas insulated bus according to claim 6, wherein three phases of the first main circuit conductors and second main circuit conductors are respectively housed as one entity in the first and second metallic containers.

8. The gas insulated bus according to claim 7, wherein either of the arrangements of three phases of the first main circuit conductors and second main circuit conductors in the first and second metallic containers forms an equilateral triangle.

9. The gas insulated bus according to claim 1, wherein an embedded electrode on the shield side is embedded in the other end of the insulating spacer;
the other end of the insulating spacer is attached to the shield at the recess; and
at least part of the embedded electrode on the shield side is placed in the recess.

10. The gas insulated bus according to claim 1, wherein the end of the first main circuit conductor is inserted into the shield through the first opening;
the end of the second main circuit conductor is inserted into the shield through the second opening;
the end of the first main circuit conductor is connected with a first contact maker slidable along the first direction in the shield; and
the end of the second main circuit conductor is connected with a second contact maker slidable along the second direction in the shield.

11. The gas insulated bus according to claim 10, wherein an adaptor conductor that has a first arm extending in the first direction and a second arm extending in the second direction and that is fixed to the other end of the insulating spacer via the shield, is placed inside the shield;
the end of the first main circuit conductor and the first arm are connected by the first contact maker; and
the end of the second main circuit conductor and the second arm are connected by the second contact maker.

12. The gas insulated bus according to claim 10, wherein the outside diameter of the end of the first main circuit conductor to be connected with the first contact maker is smaller than the outside diameter of part other than the end of the first main circuit conductor, and
wherein the outside diameter of the end of the second main circuit conductor to be connected with the second contact maker is smaller than the outside diameter of part other than the end of the second main circuit conductor.

13. The gas insulated bus according to claim 10, wherein the diameter of the first opening is greater than the outside diameter of the first main circuit conductor, and
wherein the diameter of the second opening is greater than the outside diameter of the second main circuit conductor.

* * * * *